(12) United States Patent
Martin et al.

(10) Patent No.: US 10,117,122 B2
(45) Date of Patent: Oct. 30, 2018

(54) TELECOMMUNICATIONS APPARATUS AND METHODS

(71) Applicant: SONY CORPORATION, Tokyo (JP)

(72) Inventors: Brian Alexander Martin, Weybridge (GB); Martin Warwick Beale, Weybridge (GB); Hiroaki Takano, Weybridge (GB); Anders Berggren, Weybridge (GB)

(73) Assignee: SONY CORPORATION, Tokyo (JP)

( * ) Notice: Subject to any disclaimer, the term of this patent is extended or adjusted under 35 U.S.C. 154(b) by 59 days.

(21) Appl. No.: 15/523,573

(22) PCT Filed: Nov. 10, 2015

(86) PCT No.: PCT/EP2015/076170
§ 371 (c)(1),
(2) Date: May 1, 2017

(87) PCT Pub. No.: WO2016/075123
PCT Pub. Date: May 19, 2016

(65) Prior Publication Data
US 2017/0311195 A1    Oct. 26, 2017

(30) Foreign Application Priority Data

Nov. 13, 2014 (EP) .................................... 14193068

(51) Int. Cl.
*H04W 24/10* (2009.01)
*H04W 16/14* (2009.01)
(Continued)

(52) U.S. Cl.
CPC ........... *H04W 24/10* (2013.01); *H04W 16/14* (2013.01); *H04W 24/08* (2013.01); *H04W 72/0453* (2013.01); *H04W 76/27* (2018.02)

(58) Field of Classification Search
CPC . H04W 24/10; H04W 24/08; H04W 72/0453; H04W 16/14; H04W 76/27
See application file for complete search history.

(56) References Cited

U.S. PATENT DOCUMENTS

2010/0182919 A1  7/2010 Lee et al.
2011/0103249 A1  5/2011 Kim et al.
(Continued)

FOREIGN PATENT DOCUMENTS

EP     2 696 530 A2    2/2014
GB     2486926 A       7/2012
(Continued)

OTHER PUBLICATIONS

Office Action issued in European Application 15 797 894.1-1214 dated Jun. 6, 2018.
(Continued)

*Primary Examiner* — Afshawn M Towfighi
(74) *Attorney, Agent, or Firm* — Xsensus, LLP

(57) ABSTRACT

A method of operating a terminal device in a wireless telecommunications system that supports a connected mode of operation in which terminal devices receive a type user-plane data from the network infrastructure equipment using primary and/or secondary component carriers operating on different frequency bands and an idle mode of operation in which terminal devices do not receive that type of user-plane data from the network infrastructure equipment. The method includes: establishing a measurement configuration making measurements of radio channel conditions for radio resources within the second frequency band; making measurement of radio channel conditions for radio resources within the second frequency band in accordance with the measurement configuration while the terminal device is operating in the idle mode; determining if the measurement of radio channel conditions meets a trigger
(Continued)

criterion, and if so, transmitting a measurement report to the network infrastructure equipment to indicate the trigger criterion has been met.

16 Claims, 6 Drawing Sheets

(51) Int. Cl.
*H04W 24/08* (2009.01)
*H04W 72/04* (2009.01)
*H04W 76/27* (2018.01)

(56) References Cited

U.S. PATENT DOCUMENTS

| | | | |
|---|---|---|---|
| 2012/0307869 | A1 | 12/2012 | Charbit et al. |
| 2013/0322279 | A1 | 12/2013 | Chincholi et al. |
| 2014/0044105 | A1 | 2/2014 | Bontu et al. |
| 2014/0204791 | A1 | 7/2014 | Teng et al. |
| 2015/0156650 | A1 | 6/2015 | Li et al. |
| 2016/0066322 | A1 | 3/2016 | Bontu et al. |
| 2016/0286449 | A1* | 9/2016 | Choi ............ H04W 36/28 |
| 2016/0330641 | A1* | 11/2016 | Zhang ........... H04W 24/02 |

FOREIGN PATENT DOCUMENTS

| | | | |
|---|---|---|---|
| WO | 2008/133471 | A1 | 11/2008 |
| WO | 2013/023377 | A1 | 2/2013 |
| WO | 2013/143053 | A1 | 10/2013 |

OTHER PUBLICATIONS

"Technical Specification 3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.3.0, Sep. 2014, (215 pages).

Ericsson, Qualcomm, Huawei, Alcatel-Lucent, "Study on Licensed-Assisted Access using LTE," 3GPP TSG RAN Meeting #65, RP-141664 revision of RP-141-646, (8 pages).

Harri Holma, et al., "LTE for UMTS OFDMA and SC-FDMA Based Radio Access," John Wiley and Sons, 2009, (4 pages).

"Technical Specification LTE; Evolved Universal Terrestrial Radio Access (E-UTRA); Physical channels and modulation (3GPP TS 36.211 version 11.5.0 Release 11)," ETSI TS 136 211 V11.5.0, Jan. 2014, (122 pages).

"Technical Specification LTE; Evolved Universal Terrestrial Radio Access (E-UTRA); Multiplexing and channel coding (3GPP TS 36.212 version 11.4.0 Release 11)," ETSI TS 136 212 V11.4.0, Jan. 2014, (86 pages).

"Technical Specification LTE; Evolved Universal Terrestrial Radio Access (E-UTRA); Physical layer procedures (3GPP TS 36.213 version 11.6.0 Release 11)," ETSI TS 136 213 V1 1.6.0, Mar. 2014, (184 pages).

"Technical Specification LTE; Evolved Universal Terrestrial Radio Access (E-UTRA); Medium Access Control (MAC) protocol specification (3GPP TS 36.321 version 11.5.0 Release 11)," ETSI TS 136 321 V11.5.0, Mar. 2014, (59 pages).

"Technical Specification LTE; Evolved Universal Terrestrial Radio Access (E-UTRA); Radio Resource Control (RRC); Protocol specification (3GPP TS 36.331 version 11.7.0 Release 11)," ETSI TS 136 331 V11.7.0, Mar. 2014, (354 pages).

International Search Report dated Feb. 9, 2016 in PCT/EP2015/076170 filed Nov. 10, 2015.

Extended European Search Report dated Feb. 5, 2018 in corresponding European Patent Application No. 17187439.9, 23 pages.

* cited by examiner

TELECOMMUNICATIONS APPARATUS AND METHODS

CROSS-REFERENCE TO RELATED APPLICATIONS

The present application is based on PCT filing PCT/EP2015/076170 filed Nov. 10, 2015, and claims priority to European Patent Application 14 193 068.5, filed in the European Patent Office on Nov. 13, 2014, the entire contents of each of which being incorporated herein by reference.

BACKGROUND

Field

The present disclosure relates to telecommunications apparatus and methods, for example mobile communications networks and methods for communicating data using mobile communications networks, infrastructure equipment for mobile communications networks, communications devices for communicating data via mobile communications networks and methods of communicating via mobile communications networks.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

It is well known in the field of wireless telecommunications for regions of the radio spectrum to be assigned to different mobile network operators (MNO) for their exclusive use through a license. A license typically grants an MNO exclusive use over a number of years of a predefined portion of the radio frequency spectrum in which to deploy a mobile communications network (e.g. GSM, WCDMA/HSPA, LTE/LTE-A). This licensing approach can help guarantee Quality of Service (QoS) and provides an operator with control of the radio resources and mobility. In particular, an operator has some degree of guarantee that no other radio services should interfere with the radio resources that have been assigned to the operator, and within the limitations of the license conditions the operator has exclusive control over what radio technology it deploys in the network. Consequently, a wireless telecommunications system that is primarily designed to operate using radio resources that have been licensed for exclusive use by the wireless telecommunications system can operate with a degree of centralized control and coordination to you a full help make most efficient use of the available radio resources. Such a wireless telecommunication system can also manage interference internally, based on standard specifications, since the licence grants it a degree of immunity from external interference sources. Coexistence of different devices deployed on an MNO's licensed band can be managed through conformance to relevant radio standards. Licensed spectrum is today usually assigned to operators via government-organized auctions, but so-called "beauty contests" continue also to be in use.

It is also well known in the field of wireless telecommunications for regions of the available radio spectrum to remain unlicensed. Unlicensed (licence exempt) radio spectrum may, at least to some extent, be freely used by a number of different technologies, such as Wi-Fi and Bluetooth and other non-3GPP radio access technologies (RATs). Operating parameters for devices using unlicensed spectrum bands are typically stipulated by technical regulatory requirements, e.g. the FCC Part 15 rule for 2.4 GHz ISM band. Coexistence of different devices deployed on an unlicensed band generally lacks centralized coordination and control and so is usually based on such technical rules and various politeness protocols.

The use of wireless telecommunications system technologies designed for operation on licensed radio spectrum, such as LTE, is becoming more and more prevalent, both in terms of increasing take-up of established uses for wireless telecommunications technologies, and also the introduction of new uses, e.g., in the developing field of machine-type communications (MTC). In order to help provide more bandwidth to support this increased use of wireless telecommunications technologies, it has recently been proposed to use unlicensed radio spectrum resources to support operations on licensed radio spectrum.

However, in contrast to licensed spectrum, unlicensed spectrum can be shared and used among different technologies, or different networks using the same technology, without any co-ordinated/centralised control, for example to provide protection against interference. As a consequence of this, the use of wireless technologies in unlicensed spectrum can be subject to unpredictable interference with no guarantees of spectrum resource availability and radio connections taking place on a best effort basis. Thus the operation of wireless network technologies on shared radio resource spectrum (such as unlicensed spectrum) can be impacted by the operation of other radio access technologies, such as wireless local area networks, and conversely the operation of such other radio access technologies can be impacted by the operation of the wireless network technologies on the shared portions of the radio spectrum.

For example, an LTE-based wireless telecommunications network that is able to make use of radio resources shared with a wireless local area network radio access technology (WLAN) could potentially prevent a WLAN access point from operating properly, at least temporarily. For example, certain WLAN radio access technologies, such as Wi-Fi, operate on a "listen-before-talk" basis to help manage access to the shared resources. Basically, a device operating on the WLAN that wishes to access certain radio resources will first monitor the radio resources to determine if they are currently available or already in use. An LTE-based wireless telecommunications network may be configured to adopt a similar "listen-before-talk" approach in respect of its communications on shared radio resources to seek to avoid making transmissions on resources currently being used for WLAN communications. However, an issue with this approach can arise because of differences in typical coverage areas associated with WLAN access points and LTE base stations. For example, an LTE base station may be too far from a WLAN access point to be able to detect ongoing WLAN communications associated with the WLAN access point but the WLAN access point may nonetheless be within the coverage area of the LTE base station downlink signals. Accordingly, a base station implementing a "listen-before-talk" approach to help govern its access to shared radio resources may not be able to detect communications associated with the WLAN access point when the base station is monitoring the relevant radio resource usage by other devices ("listen"). Accordingly, the base station may conclude it is free to transmit ("talk") on radio resources which are being used by the WLAN access point, thereby interfering with the WLAN access point and potentially making it unavailable while the LTE base station is transmitting. In some respects this may be referred to as a "hidden node" issue.

These types of issue mean that wireless network technologies, such as LTE, which are generally designed to operate using licensed radio resources, may benefit from modified approaches to allow them to efficiently use shared radio resources, and in particular to co-exist reliably and fairly with other radio access technologies accessing the shared resources. Therefore, deploying a mobile radio access technology system primarily designed to operate in licensed spectrum bands (i.e. having exclusive access to, and hence a level of control over, the relevant radio resources) in a manner which is required by operation in a shared/unlicensed spectrum band (i.e. without having exclusive access to at least some of the relevant radio resources), gives rise to new technical challenges.

SUMMARY

According to one aspect of the present disclosure, there is provided a method of operating a terminal device in a wireless telecommunications system configured to support communications between network infrastructure equipment and terminal devices using a primary component carrier operating on radio resources within a first frequency band and a secondary component carrier operating on radio resources within a second frequency band, wherein the wireless telecommunications system supports a connected mode of operation in which terminal devices receive user-plane data from the network infrastructure equipment using the primary and/or secondary component carrier and an idle mode of operation in which terminal devices do not receive user-plane data from the network infrastructure equipment, wherein the method comprises: establishing a measurement configuration for making measurements of radio channel conditions for radio resources within the second frequency band; making a measurement (assessment) of radio channel conditions for radio resources within the second frequency band in accordance with the measurement configuration while the terminal device is operating in the idle mode; determining if the measurement of radio channel conditions meets a trigger criterion, and if so, transmitting a measurement report to the network infrastructure equipment to indicate the trigger criterion has been met.

According to another aspect of the present disclosure, there is provided a terminal device for use in a wireless telecommunications system configured to support communications between network infrastructure equipment and terminal devices using a primary component carrier operating on radio resources within a first frequency band and a secondary component carrier operating on radio resources within a second frequency band, wherein the wireless telecommunications system supports a connected mode of operation in which terminal devices receive user-plane data from the network infrastructure equipment using the primary and/or secondary component carrier and an idle mode of operation in which terminal devices do not receive user-plane data from the network infrastructure equipment, wherein the terminal device comprises a controller unit and a transceiver unit configured to operate together to: establish a measurement configuration for making measurements of radio channel conditions for radio resources within the second frequency band; make a measurement of radio channel conditions for radio resources within the second frequency band in accordance with the measurement configuration while the terminal device is operating in the idle mode; determine if the measurement of radio channel conditions meets a trigger criterion, and if so, transmit a measurement report to the network infrastructure equipment to indicate the trigger criterion has been met.

According to one aspect of the present disclosure, there is provided circuitry for a terminal device for use in a wireless telecommunications system configured to support communications between network infrastructure equipment and terminal devices using a primary component carrier operating on radio resources within a first frequency band and a secondary component carrier operating on radio resources within a second frequency band, wherein the wireless telecommunications system supports a connected mode of operation in which terminal devices receive user-plane data from the network infrastructure equipment using the primary and/or secondary component carrier and an idle mode of operation in which terminal devices do not receive user-plane data from the network infrastructure equipment, wherein the circuitry comprises a controller element and a transceiver element configured to operate together to: establish a measurement configuration for making measurements of radio channel conditions for radio resources within the second frequency band; make a measurement of radio channel conditions for radio resources within the second frequency band in accordance with the measurement configuration while the terminal device is operating in the idle mode; determine if the measurement of radio channel conditions meets a trigger criterion, and if so, transmit a measurement report to the network infrastructure equipment to indicate the trigger criterion has been met.

According to one aspect of the present disclosure, there is provided a method of operating network infrastructure equipment in a wireless telecommunications system configured to support communications between the network infrastructure equipment and terminal devices using a primary component carrier operating on radio resources within a first frequency band and a secondary component carrier operating on radio resources within a second frequency band, wherein the wireless telecommunications system supports a connected mode of operation in which terminal devices receive user-plane data from the network infrastructure equipment using the primary and/or secondary component carrier and an idle mode of operation in which terminal devices do not receive user-plane data from the network infrastructure equipment, wherein the method comprises: communicating user plane-data with a first terminal device operating in the connected mode using the primary and/or secondary component carrier; configuring a second terminal device to make a measurement of radio channel conditions for radio resources within the second frequency band while the second terminal device is operating in the idle mode and to determine if the measurement of radio channel conditions meets a trigger criterion, and if so, transmit a measurement report to the network infrastructure equipment to indicate the trigger criterion has been met; receiving a measurement report from the second terminal device indicating the second terminal device has determined the measurement of radio channel conditions met the trigger criterion; and modifying the communication of user-plane data with the first terminal device using the primary and/or secondary component carrier in response thereto.

According to one aspect of the present disclosure, there is provided network infrastructure equipment for use in a wireless telecommunications system configured to support communications between the network infrastructure equipment and terminal devices using a primary component carrier operating on radio resources within a first frequency band and a secondary component carrier operating on radio resources within a second frequency band, wherein the wireless telecommunications system supports a connected mode of operation in which terminal devices receive user-plane data from the network infrastructure equipment using the primary and/or secondary component carrier and an idle mode of operation in which terminal devices do not receive user-plane data from the network infrastructure equipment; wherein the network infrastructure equipment comprises a controller unit and a transceiver unit configured to operate together to: communicate user plane-data with a first terminal device operating in the connected mode using the primary and/or secondary component carrier; configure a second terminal device to make a measurement of radio channel conditions for radio resources within the second frequency band while the second terminal device is operating in the idle mode and to determine if the measurement of radio channel conditions meets a trigger criterion, and if so, transmit a measurement report to the network infrastructure equipment to indicate the trigger criterion has been met; receive a measurement report from the second terminal device indicating the second terminal device has determined the measurement of radio channel conditions met the trigger criterion; and modify the communication of user-plane data with the first terminal device using the primary and/or secondary component carrier in response thereto.

According to one aspect of the present disclosure, there is provided circuitry for a network infrastructure equipment for use in a wireless telecommunications system configured to support communications between the network infrastructure equipment and terminal devices using a primary component carrier operating on radio resources within a first frequency band and a secondary component carrier operating on radio resources within a second frequency band, wherein the wireless telecommunications system supports a connected mode of operation in which terminal devices receive user-plane data from the network infrastructure equipment using the primary and/or secondary component carrier and an idle mode of operation in which terminal devices do not receive user-plane data from the network infrastructure equipment; wherein the circuitry comprises a controller element and a transceiver element configured to operate together to: communicate user plane-data with a first terminal device operating in the connected mode using the primary and/or secondary component carrier; configure a second terminal device to make a measurement of radio channel conditions for radio resources within the second frequency band while the second terminal device is operating in the idle mode and to determine if the measurement of radio channel conditions meets a trigger criterion, and if so, transmit a measurement report to the network infrastructure equipment to indicate the trigger criterion has been met; receive a measurement report from the second terminal device indicating the second terminal device has determined the measurement of radio channel conditions met the trigger criterion; and modify the communication of user-plane data with the first terminal device using the primary and/or secondary component carrier in response thereto.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
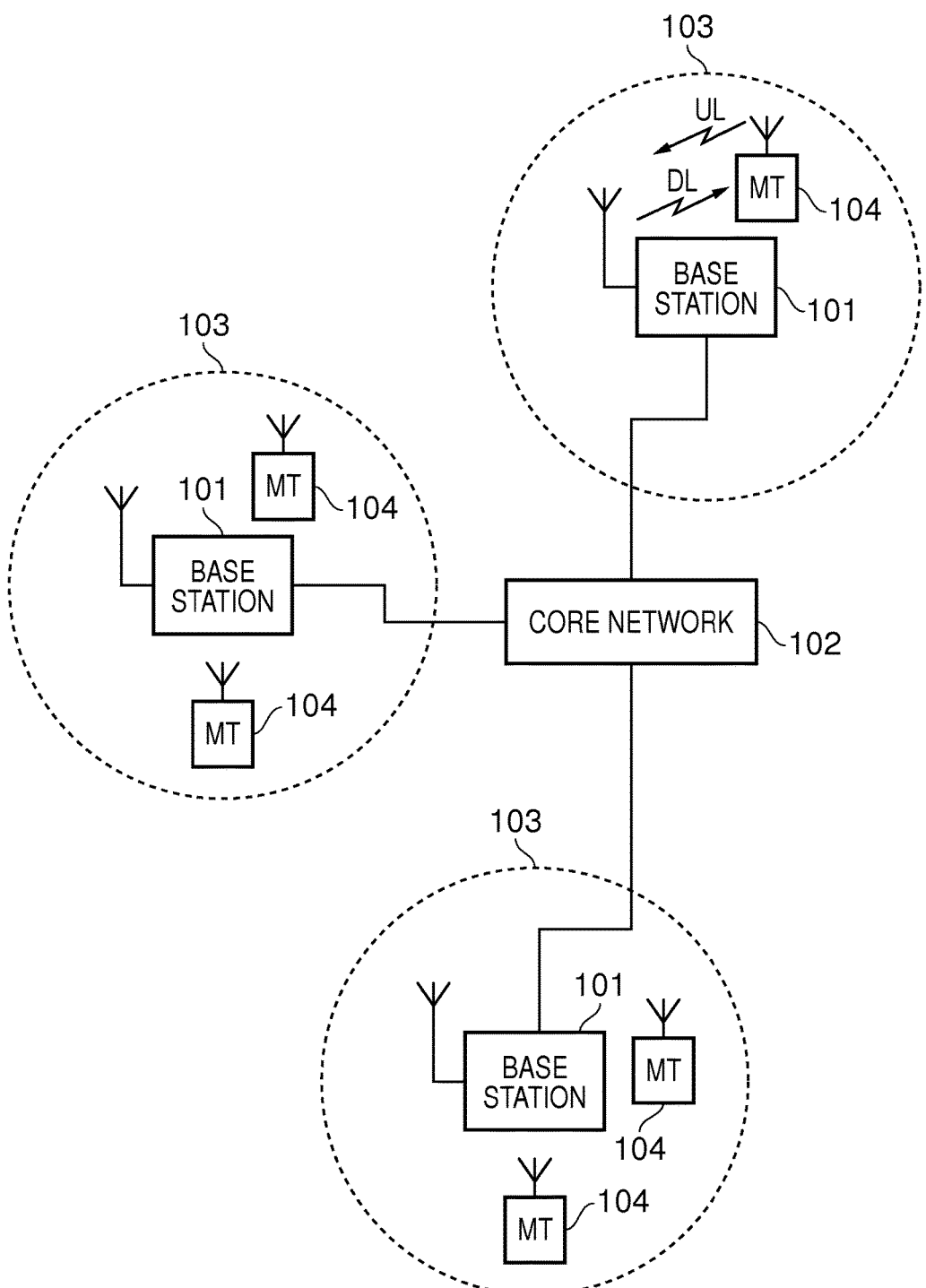
FIG. 1 provides a schematic diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs, and so forth.

Figure 2:
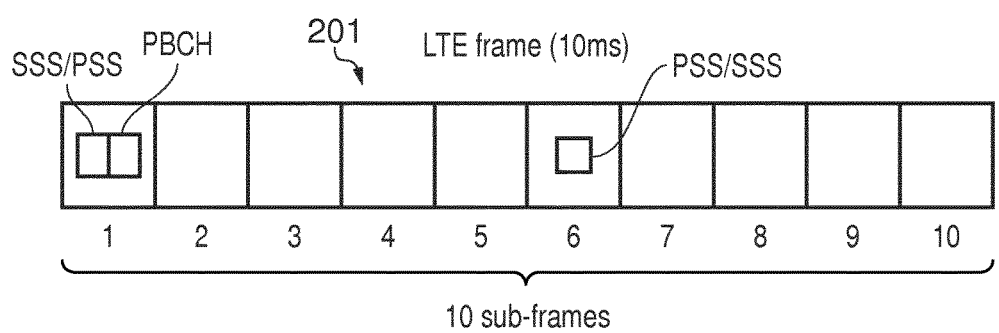
FIG. 2 provides a schematic diagram illustrating a LTE radio frame.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. FIG. 2 shows a schematic diagram illustrating an OFDM based LTE downlink radio frame 201. The LTE downlink radio frame is transmitted from a LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
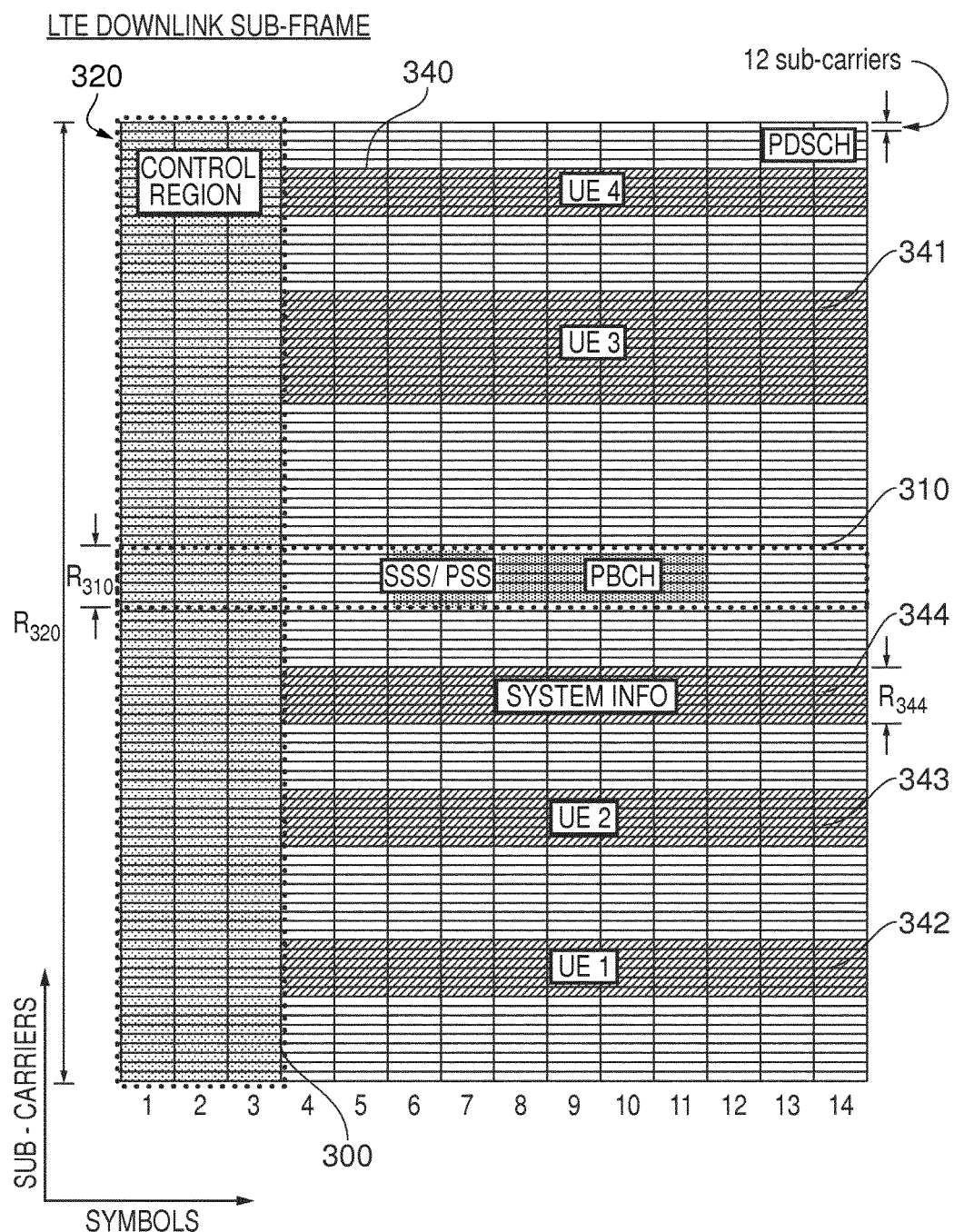
FIG. 3 provides a schematic diagram illustrating an example of a LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 3 comprises 14 symbols and 1200 subcarriers spread across a 20 MHz bandwidth licenced for use by the operator of the network 100, and this example is the first subframe in a frame (hence it contains PBCH). The smallest allocation of physical resource for transmission in LTE is a resource block comprising twelve subcarriers transmitted over one subframe. For clarity, in FIG. 3, each individual resource element is not shown, instead each individual box in the subframe grid corresponds to twelve subcarriers transmitted on one symbol.

FIG. 3 shows in hatching resource allocations for four LTE terminals 340, 341, 342, 343. For example, the resource allocation 342 for a first LTE terminal (UE 1) extends over five blocks of twelve subcarriers (i.e. 60 subcarriers), the resource allocation 343 for a second LTE terminal (UE2) extends over six blocks of twelve subcarriers (i.e. 72 subcarriers), and so on.

Control channel data can be transmitted in a control region 300 (indicated by dotted-shading in FIG. 3) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to host carriers with a channel bandwidth of 3 MHz or greater so the maximum value of "n" will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information. Control channel data can also or alternatively be transmitted in a second region of the subframe comprising a number of subcarriers for a time substantially equivalent to the duration of the subframe, or substantially equivalent to the duration of the subframe remaining after the "n" symbols. The data transmitted in this second region is transmitted on the enhanced physical downlink control channel (EPDCCH). This channel transmits physical layer control information which may be in addition to that transmitted on other physical layer control channels.

PDCCH and EPDCCH contain control data indicating which subcarriers of the subframe have been allocated to specific terminals (or all terminals or subset of terminals). This may be referred to as physical-layer control signalling/data. Thus, the PDCCH and/or EPDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow a LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to terminals on the physical downlink shared channel (PDSCH), which may also be referred to as a downlink data channel, can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer).

FIG. 3 also shows a region of PDSCH containing system information and extending over a bandwidth of R344. A conventional LTE subframe will also include reference signals which are not shown in FIG. 3 in the interests of clarity.

The number of subcarriers in a LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 3). As is known in the art, data transmitted on the PDCCH, PCFICH and PHICH is typically distributed on the subcarriers across the entire bandwidth of the subframe to provide for frequency diversity.

The communications between the base stations 101 and the terminal devices 104 are conventionally made using radio resources that have been licensed for exclusive use by the operator of the network 100. These licensed radio resources will be only a portion of the overall radio spectrum. Other devices within the environment of the network 100 may be wirelessly communicating using other radio resources. For example, a different operator's network may be operating within the same geographical region using different radio resources that have been licensed for use by the different operator. Other devices may be operating using other radio resources in an unlicensed radio spectrum band, for example using Wi-Fi or Bluetooth technologies.

As noted above, it has been proposed that a wireless telecommunications network using radio resources in a licensed portion of the radio spectrum might be supported by using radio resources in an unlicensed portion of the radio spectrum (i.e. a portion of the radio spectrum over which the wireless telecommunications network does not have exclusive access, but rather which is shared by other access technologies and/or other wireless telecommunications networks). In particular, it has been proposed that carrier aggregation based techniques may be used to allow unlicensed radio resources to be used in conjunction with licensed radio resources.

In essence, carrier aggregation allows for communications between a base station and a terminal device to be made using more than one carrier. This can increase the maximum data rate that may be achieved between a base station and a terminal device as compared to when using only one carrier and can help enable more efficient and productive use of fragmented spectrum. Individual carriers that are aggregated are commonly referred to as component carriers (or sometimes simply components). In the context of LTE, carrier aggregation was introduced in Release 10 of the standard. In accordance with the current standards for carrier aggregation in an LTE-based system, up to five component carriers can be aggregated for each of downlink and uplink. The component carriers are not required to be contiguous with one another and can have a system bandwidth corresponding to any of the LTE-defined values (1.4 MHz, 3 MHz, 5 MHz, 10 MHz, 15 MHz and 20 MHz), thereby allowing a total bandwidth of up to 100 MHz. Of course it will be appreciated this is just one example of a specific carrier aggregation implementation and other implementations may allow for different numbers of component carriers and/or bandwidths.

Further information on the operation of carrier aggregation in the context of LTE-based wireless telecommunications systems can be found in the relevant standards documents, such as ETSI TS 136 211 V 11.5.0 (2014-01)/3GPP TS 36.211 version 11.5.0 Release 11 [2], ETSI TS 136 212 V 11.4.0 (2014-01)/3GPP TS 36.212 version 11.4.0 Release 11 [3]; ETSI TS 136 213 V 11.6.0 (2014-03)/3GPP TS 36.213 version 11.6.0 Release 11 [4]; ETSI TS 136 321 V 11.5.0 (2014-03)/3GPP TS 36.321 version 11.5.0 Release 11 [5]; and ETSI TS 136 331 V 11.7.0 (2014-03)/3GPP TS 36.331 version 11.7.0 Release 11 [6].

In accordance with the terminology and implementation used for carrier aggregation in the context of an LTE-based system, a cell is denoted the 'primary cell', or Pcell, for a terminal device if it is the cell that is initially configured during connection setup for the terminal device. Thus the primary cell handles RRC (radio resource control) connection establishment/re-establishment for the terminal device. The primary cell is associated with a downlink component carrier and an uplink component carrier (CoC). These may sometimes be referred to herein as primary component carriers. A cell that is configured for use by the terminal device after initial connection establishment on the Pcell is termed a 'secondary cell', or Scell. Thus the secondary cells are configured after connections establishment to provide additional radio resources. The carriers associated with Scells may sometimes be referred to herein as secondary component carriers. Since in LTE up to five component carriers can be aggregated, up to four Scells (correspondingly associated with up to four secondary component carriers) can be configured for aggregation with the primary cell (associated with the primary component carrier). An Scell might not have both a downlink and uplink component carrier and the association between uplink component carriers and downlink component carriers is signalled in SIB2 on each downlink component carrier. The primary cell supports PDCCH and PDSCH on downlink and PUSCH and PUCCH on uplink whereas the secondary cell(s) support PDCCH and PDSCH on downlink and PUSCH on uplink, but not PUCCH. Measurement and mobility procedures are handled on the Pcell and the Pcell cannot be de-activated. The Scell(s) may be dynamically activated and deactivated, for example according to traffic needs, though MAC layer signalling to the terminal device. An Scells for a terminal device may also be deactivated automatically (time out) if the terminal device does not receive any transmission resource allocations on the Scell for a threshold amount of time.

Some aspects of physical layer control signalling for an LTE-based implementation of carrier aggregation based on the current standards are now described.

Each downlink component carrier has the normal LTE control channels: (E)PDCCH, PCFICH and PHICH. However, carrier aggregation introduces the possibility of so-called cross-carrier scheduling (XCS) on PDCCH. To support cross-carrier scheduling, a downlink control information (DCI) message on PDCCH includes a carrier indicator field (CIF) comprising three bits to indicate which of the component carriers the PDCCH message applies to. If there is no CIF, the PDCCH is treated as applying to the carrier on which it is received. A motivation for providing cross-carrier scheduling primarily applies for heterogeneous network (het-net) scenarios where overlaid macro- and small-cells may operate carrier aggregation in the same band. The effects of interference between the respective macro- and small-cells' PDCCH signalling can be mitigated by having the macro-cell transmit its PDCCH signalling on one component carrier at relatively high transmit power (to provide coverage across the macro-cell), while the small-cells use an alternative component carrier for their PDCCH scheduling.

The control region supporting PDCCH may differ in size (i.e. number of OFDM symbols) between component carriers, so they can carry different PCFICH values. However, the potential for interference in the control region in a het-net implementation may mean that PCFICH cannot be decoded on a particular component carrier. Therefore, current LTE standards allow for each component to carrier a semi-static indication of which OFDM symbol PDSCH can be assumed to begin in each subframe. If fewer OFDM symbols are actually used for the control region, the free/spare OFDM symbol(s) may be used for PDSCH transmissions to terminal devices which are not being cross-carrier scheduled as they will decode the actual PCFICH. If more OFDM symbols actually used for the control region, there will be some degree of performance degradation for the cross-carrier scheduled terminal devices.

PHICH signalling is sent on the downlink component carrier that sent the PDCCH signalling containing the PUSCH allocation to which the PHICH signalling relates. Accordingly, one downlink component carrier may carry PHICH for more than one component carrier.

In the uplink, the basic operation of PUCCH is not altered by the introduction of carrier aggregation. However, a new PUCCH format (format 3) is introduced to support the sending of acknowledgement signalling (ACK/NACK signalling) for multiple downlink component carriers, and with some alterations to format 1b to increase the number of ACK/NACK bits it can carry.

In current LTE-based carrier aggregation scenarios, primary and secondary synchronisation signalling (PSS and SSS) are transmitted on all component carriers using the same physical-layer cell identity (PCI) and component carriers are all synchronised with one another. This can help with cell search and discovery procedures. Issues relating to security and system information (SI) are handled by the Pcell. In particular, when activating an Scell, the Pcell delivers the relevant SI for the Scell to the terminal device using dedicated RRC signalling. If the system information relating to a Scell changes, the Scell is released and re-added by Pcell RRC signalling (in one RRC message). Pcell changes, e.g. due to long-term fluctuations in channel quality across the Pcell bandwidth, are handled using a modified handover procedure. The source Pcell passes all the relevant carrier aggregation (CA) information to the target Pcell so the terminal device can begin to use all the assigned component carriers when handover is complete.

Random access procedures are primarily handled on the uplink component carrier of Pcell for a terminal device, although some aspects of contention resolution signalling may be cross-carrier scheduled to another serving cell (i.e. an Scell).

As noted above, carrier aggregation is one approach for making use of unlicensed radio spectrum resources in wireless communication networks which are primarily designed to use licensed radio spectrum. In broad summary, a carrier aggregation based approach may be used to configure and operate a first component carrier (e.g. a primary component carrier associated with a Pcell in LTE terminology) within a region of the radio spectrum that has been licensed for use by a wireless telecommunications network, and to also configure and operate one or more further component carriers (e.g. a secondary component carrier associated with an Scell in LTE terminology) in an unlicensed region of the radio spectrum. The secondary component carrier(s) operating in the unlicensed region of the radio spectrum may do so in an opportunistic manner by making use of the unlicensed radio resources when they are available. There may also be provisions made for restricting the extent to which a given operator can make use of the unlicensed radio resources, for example by defining what might be referred to as politeness protocols.

Although known carrier aggregation schemes can form a basis for using unlicensed radio spectrum resources (or other forms of shared radio resources) in conjunction with licensed radio spectrum resources, some modifications to known carrier aggregation techniques may be appropriate to help optimise performance. This is because radio interference in the unlicensed radio spectrum can be expected to be subject to a wider range of unknown and unpredictable variations in time and frequency than might be seen within a region of the radio spectrum which has been licensed for use by a particular wireless applications system. For a given wireless telecommunications system operating in accordance with a given technology, such as LTE-A (Long Term Evolution Advanced), interference in the unlicensed radio spectrum may arise from other systems operating using the same technology, or from systems operating according to different technologies, such as Wi-Fi or Bluetooth.

Figure 4:
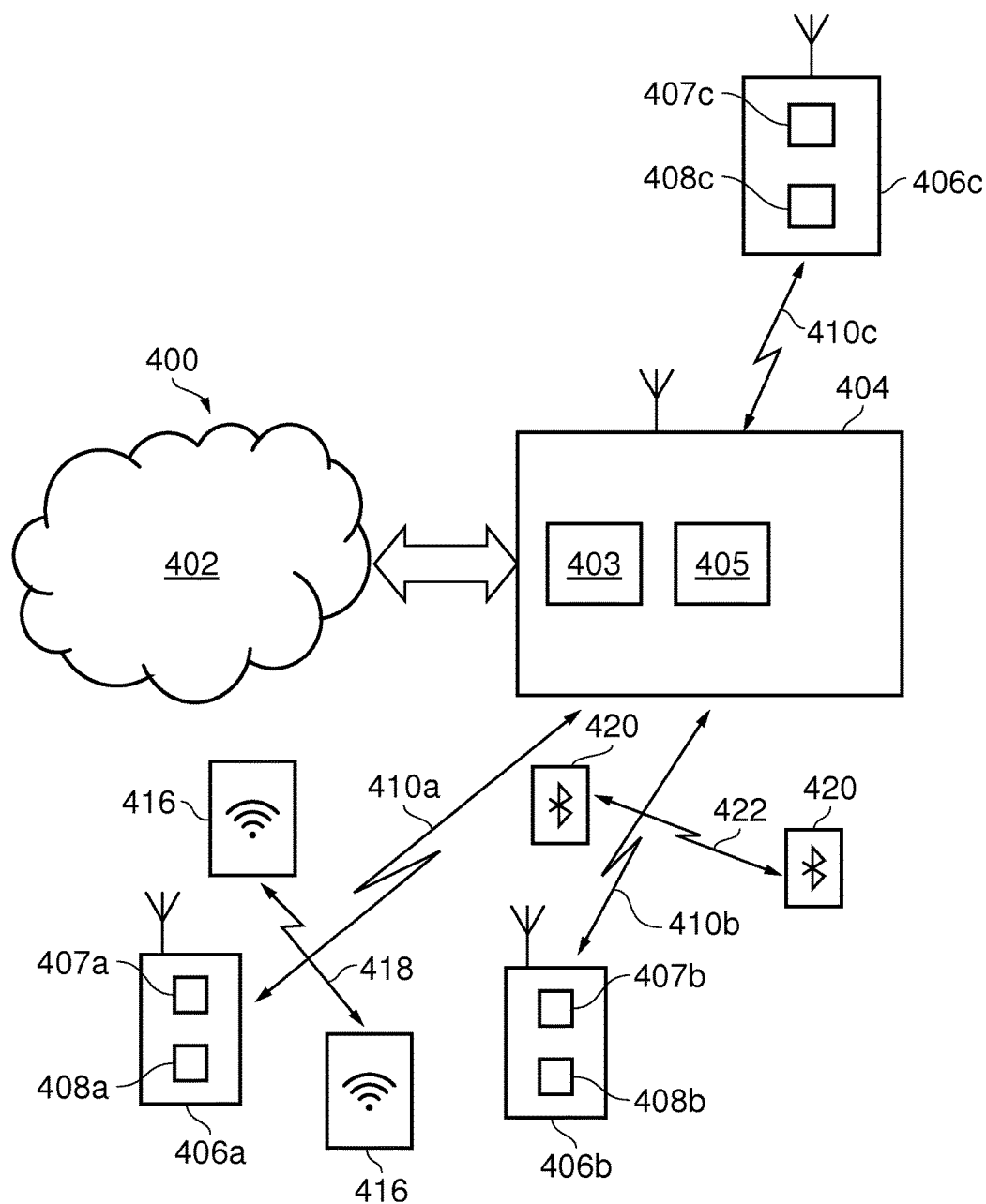
FIG. 4 schematically represents a wireless telecommunications system according to an embodiment of the disclosure.

FIG. 4 schematically shows a telecommunications system 400 according to an embodiment of the disclosure. The telecommunications system 400 in this example is based broadly on a LTE-type architecture. As such many aspects of the operation of the telecommunications system 400 are standard and well understood and not described here in detail in the interest of brevity. Operational aspects of the telecommunications system 400 which are not specifically described herein may be implemented in accordance with any known techniques, for example according to the established LTE-standards and known variations thereof.

The telecommunications system 400 comprises a core network part (evolved packet core) 402 coupled to a radio network part. The radio network part comprises a base station (evolved-nodeB) 404, a first terminal device 406a, a second terminal device 406b and a third terminal device 406c (which may be referred to collectively as terminal devices 406). It will of course be appreciated that in practice the radio network part may comprise a plurality of base stations serving a larger number of terminal devices across various communication cells. However, only a single base station 404 and three terminal devices 406 are shown in FIG. 4 in the interests of simplicity.

Although not part of the telecommunications system 400 itself, also shown in FIG. 4 are some other devices which are operable to wirelessly communicate with one another and which are operating within the radio environment of the telecommunications system 400. In particular, there is a pair of wireless access devices 416 communicating with one another via radio link 418 operating in accordance with a Wi-Fi standard and a pair of Bluetooth devices 420 communicating with one another via radio link 422 operating in accordance with a Bluetooth standard. These other devices represent a potential source of radio interference and competition for resources for the telecommunications system 400 and vice versa. It will be appreciated that in practice there will typically be many more such devices operating in the radio environment of the wireless telecommunications system 400, and only two pairs of devices 416, 418 are shown in FIG. 4 for simplicity.

As with a conventional mobile radio network, the terminal devices 406 are arranged to wirelessly communicate data to and from the base station (transceiver station) 404. The base station is in turn communicatively connected to a serving gateway, S-GW, (not shown) in the core network part which is arranged to perform routing and management of mobile communications services to the terminal devices 406 in the telecommunications system 400 via the base station 404. In order to maintain mobility management and connectivity, the core network part 402 also includes a mobility management entity (not shown) which manages the enhanced packet service, EPS, connections with the terminal devices 406 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 402 to an external packet data network, for example the Internet. As noted above, the operation of the various elements of the communications system 400 shown in FIG. 4 may be broadly conventional apart from where modified to provide functionality in accordance with embodiments of the disclosure as discussed herein.

The terminal devices 406a, 406b, 406c each comprise a respective transceiver unit 407a, 407b, 407c (which may be collectively referred to as transceiver units 407) for transmission and reception of wireless signals and respective controller units 408a, 408b, 408c (which may be collectively referred to as controller units 408) configured to control the operation of the respective devices 406 in accordance with embodiments of the disclosure. The respective controller units 408 may each comprise a processor unit which is suitably configured/programmed to provide the desired functionality described herein using conventional programming/configuration techniques for equipment in wireless telecommunications systems. For each of the terminal devices 406, their respective transceiver units 407 and controller units 408 are schematically shown in FIG. 4 as separate elements for ease of representation. However, it will be appreciated that for each terminal device 406 the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the terminal devices 406 will in general comprise various other elements associated with their operating functionality in accordance with established wireless telecommunications techniques (e.g. a power source, possibly a user interface, and so forth).

As has become commonplace in the field of wireless telecommunications, terminal devices may support Wi-Fi and Bluetooth functionality in addition to cellular/mobile telecommunications functionality. Thus the transceiver units 407 of the respective terminal devices may comprise functional modules operable according to different wireless communications operating standards. For example, the terminal devices' respective transceiver units 407 may each comprise an LTE transceiver module for supporting wireless communications in accordance with an LTE-based operating standard, a WLAN transceiver module for supporting wireless communications in accordance with a WLAN operating standard (e.g. a Wi-Fi standard), and a Bluetooth transceiver module for supporting wireless communications in accordance with a Bluetooth operating standard. The underlying functionality of the different transceiver modules may be provided in accordance with conventional techniques. For example, a terminal device may have separate hardware elements to provide the functionality of each transceiver module, or alternatively, a terminal device might comprise at least some hardware elements which are configurable to provide some or all functionality of multiple transceiver modules. Thus the transceiver units 407 of the terminal devices 406 represented in FIG. 4 are assumed here to provide the functionality of an LTE transceiver module, a Wi-Fi transceiver module and a Bluetooth transceiver module in accordance with conventional wireless communications techniques.

The base station 404 comprises a transceiver unit 403 for transmission and reception of wireless signals and a controller unit 405 configured to control the base station 404. The controller unit 405 may comprise a processor unit which is suitably configured/programmed to provide the desired functionality described herein using conventional programming/configuration techniques for equipment in wireless telecommunications systems. The transceiver unit 403 and the controller unit 405 are schematically shown in FIG. 4 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 404 will in general comprise various other elements associated with its operating functionality. For example, the base station 404 will in general comprise a scheduling entity responsible for scheduling communications. The functionality of the scheduling entity may, for example, be subsumed by the controller unit 405.

Thus, the base station 404 is configured to communicate data with the terminal devices 406a, 406b, 406c over respective radio communication links 410a, 410b, 410c (which may be collectively referred to as radio communication links 410). The wireless telecommunications system 400 supports a carrier aggregation mode of operation in which radio communication links 410 comprise a wireless access interface provided by multiple component carriers. For example, each radio communication link may comprise a primary component carrier and one or more secondary component carriers. Furthermore, the elements comprising the wireless telecommunications system 400 in accordance with this embodiment of the disclosure are assumed to support carrier aggregation in an unlicensed spectrum mode. In this unlicensed spectrum mode the base station 404 communicates with terminal devices 406 using a primary component carrier operating on radio resources within a first frequency band that has been licensed for use by the wireless telecommunications system and one or more secondary component carriers operating on radio resources within a second frequency band that has not been licensed for exclusive use by the wireless telecommunications system. The first frequency band may sometimes be referred to herein as a licensed frequency band and the second frequency band may sometimes be referred to herein as an unlicensed (U) frequency band. In the context of an LTE-based wireless telecommunications system, such as that represented in FIG. 4, operation in the unlicensed frequency band may sometimes be referred to as an LTE-U mode of operation. The first (licenced) frequency band may be referred to as an LTE band (or more particularly an LTE-A band) and the second (unlicensed) frequency band may be referred to as an LTE-U band. Resources on the LTE-U band may be referred to as U-resources. A terminal device able to make use of U-resources may be referred to as a U-terminal device (or U-UE). More generally, the qualifier "U" may be used herein to conveniently identify operations in respect of a frequency band comprising radio resources that may be accessed by a plurality of wireless communications systems (i.e. what might frequently be an unlicensed frequency band). Using shared radio resources to support communications in a wireless telecommunications system in this way may also be sometimes referred to as licensed assisted access, LAA.

It will be appreciated that the use of carrier aggregation techniques and the use of unlicensed spectrum resources (i.e. resources that may be used by other devices without centralised coordination) in accordance with embodiments of the disclosure may be based generally around previously proposed principles for such modes of operation, for example as discussed above, but with modifications as described herein to provide additional functionality in accordance with embodiments of the present disclosure. Accordingly, aspects of the carrier aggregation and shared spectrum (e.g. licensed assisted access) operation which are not described in detail herein may be implemented in accordance with known techniques.

Modes of operation for the wireless telecommunications network 400 represented in FIG. 4 in accordance with certain embodiments of the disclosure will now be described. Two main scenarios will be described with reference to FIGS. 5 and 6. However, it will be appreciated the various aspects and features of the scenarios represented in FIGS. 5 and 6 may be combined in accordance with some embodiments of the disclosure. That is to say, wireless telecommunications systems in accordance with certain embodiments of the disclosure may incorporate the functionality described herein with reference to both FIGS. 5 and 6 while certain other embodiments may not incorporate some aspects of the functionality described herein with reference to FIGS. 5 and/or 6.

Figure 5:
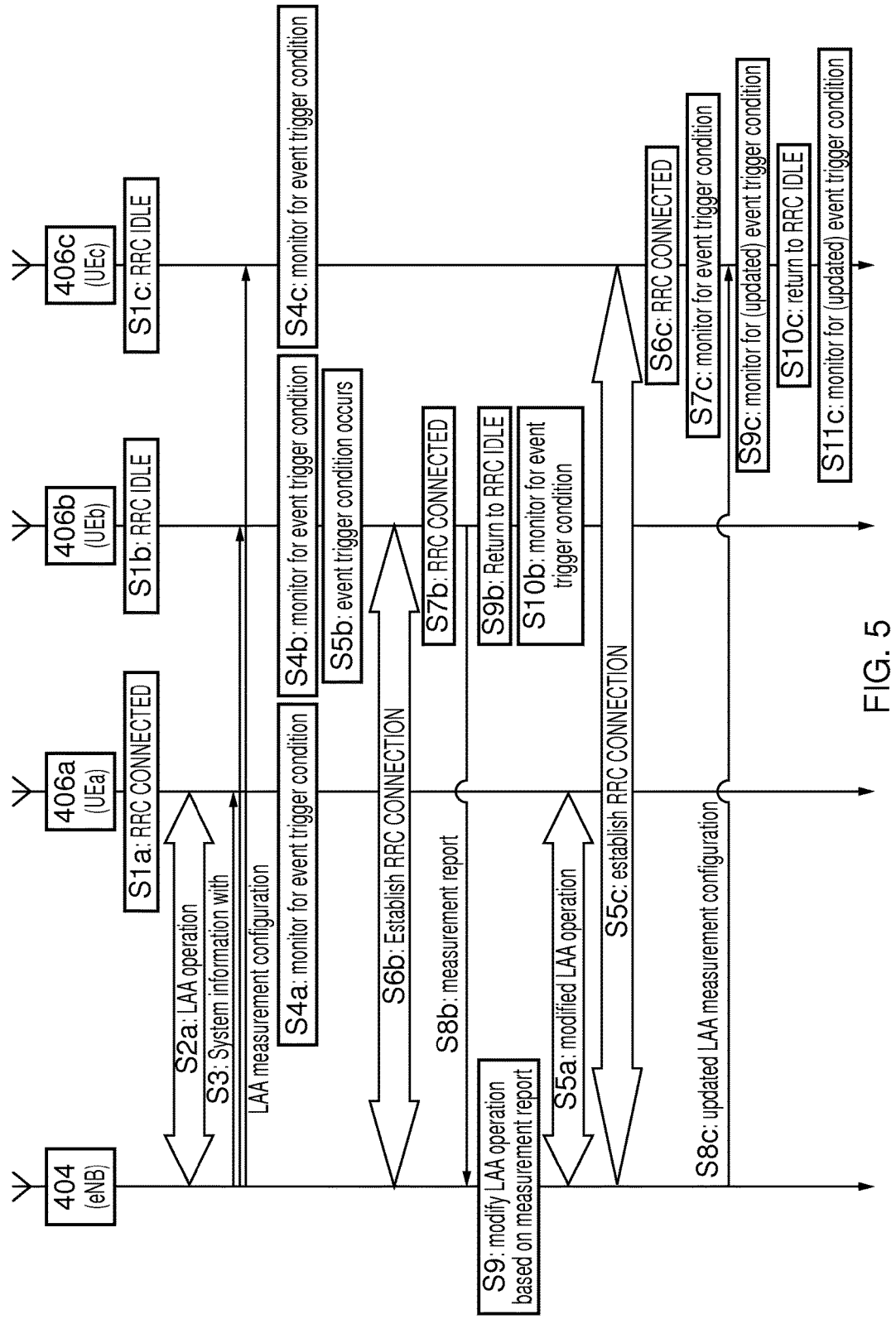
FIG. 5 is a signalling ladder diagram representing some operating aspects of a base station and a terminal device in accordance with some embodiments of the disclosure.

The general scenario represented in FIG. 5 is one in which the wireless telecommunications system 400 is configured to support LAA (LTE-U) operations. The LLA operation may be based on any previously proposed scheme but with modifications to provide functionality in accordance with embodiments of the disclosure as described herein. Thus the system 400 supports communications between the base station 404 and carrier aggregation capable terminal devices 406 using a primary component carrier (LTE-A carrier) operating on radio resources within a first frequency band and a secondary component carrier (LTE-U/LAA carrier) operating on radio resources within a second frequency band. In accordance with certain embodiments of the disclosure, the terminal devices 406 are configured for measurement reporting in respect of radio channel conditions for radio resources within the second frequency band which the base station is using (or may wish to use) for communicating on the secondary component carrier with one or more of the terminal devices in an unlicensed (shared) portion of the radio spectrum. The base station may thus, for example, take account of the measurement reporting obtained from terminal devices in accordance with the principles described herein when determining whether, and if so how, to operate one or more secondary carriers supporting communications with one or more terminal devices in the unlicensed band— i.e. the base station may take account of the measurement reports it receives to establish operating characteristics for communications on the secondary component carrier.

Thus, the LTE-A (primary) carrier provides a Pcell for the terminal devices 406 and LTE-U resources support an Scell that may be configured for use by the terminal devices 406 and in respect of which the terminal devices 406 are configured to provide measurement reports. It will be appreciated that radio resources in the second frequency band may be used to provide component carriers associated with multiple Scells in accordance with conventional carrier aggregation techniques. It will also be appreciated that while the present examples primarily focus on implementations in which the LTE-A transmissions in the licenced frequency band and the LAA transmissions in the shared frequency band are made from the same base station 404, this need not be the case in other example implementations. Furthermore, it will be appreciated the LTE-U carrier could in general be utilised with a TDD (time division duplex) or FDD (frequency division duplex) frame structure.

One significant aspect of the approach represented in FIG. 5 in accordance with certain embodiments is that one or more of the terminal devices 406 may be configured for measurement and event reporting in respect of radio resources within the second frequency band (i.e. radio resources which are, or may be, configured to support LAA operations on the secondary carrier) even if the terminal device is operating in an RRC idle mode. That is to say, terminal devices may in accordance with certain embodiments be configured to provide measurement reporting in respect of radio resources associated with LAA operations supported by a base station even if the terminal devices are not themselves involved in the LAA operations.

As is well understood, terminal devices in wireless telecommunications systems may be supported in different operating modes having regard to the extent to which they are able to receive certain types of data, such as user-plane data. For example, in an LTE-based network, such as represented in FIG. 4, there are two Radio Resource Control (RRC) modes for terminal devices, namely: (i) RRC idle mode (RRC_IDLE); and (ii) RRC connected mode (RRC_CONNECTED). To receive user-plane data, or at least a certain type of user plane data, terminal devices must be in RRC connected mode while terminal devices in RRC idle mode do not receive such data. In RRC idle mode, the core network (CN) part of the wireless telecommunications system recognizes the terminal device is present within the system, but the radio access network (RAN) part of the wireless telecommunications system does not. In effect, in an RRC idle mode the terminal device is not connected to the base station. The process of going from RRC idle mode to RRC connected mode may be referred to as connecting to a cell/base station and the process of going from RRC connected mode to RRC idle mode may be referred to as releasing a connection to a cell.

FIG. 5 is a signalling ladder diagram schematically representing example modes of operation for the base station (eNB) 404 and the first terminal device 406a (UEa), second terminal device 406b (UEb) and third terminal device 406c (UEc) represented in FIG. 4 in accordance with certain embodiments of the present disclosure. To broadly summarise, FIG. 5 represents a measurement reporting approach for a wireless telecommunications system that supports a connected mode of operation in which terminal devices receive user-plane data from network infrastructure equipment, such as a base station, using a primary and/or secondary component carrier and an idle mode of operation in which terminal devices do not receive user-plane data from the network infrastructure equipment on the primary or secondary component carrier. In accordance with the principles disclosed herein, and described further below, one or more terminal devices operating in the idle mode is configured to make a measurement of radio channel conditions for radio resources within the second frequency band in accordance with a measurement configuration that is established for the measurement, and to then determine if the measurement meets a predefined trigger criterion (e.g. determining if more than a predefined threshold level of radio interference is detected on the radio resources in respect of which the measurement made). If so, the terminal device may transmit a measurement report to the network infrastructure equipment to indicate the trigger criterion has been met, thereby allowing the base station to consider whether, and if so how, to modify any aspects of how it supports LAA operations on the secondary carrier (for example in terms of whether the LAA carrier should be used, and if so, which radio resources within the unlicensed band should be used to support the secondary carrier).

The processing represented in FIG. 5 starts from a point in which the first terminal device 406a, UEa, is operating in the RRC connected mode (as schematically indicated step S1a in FIG. 5) while the second terminal device 406b, UEb, and third terminal device 406b, UEc, are operating in the RRC idle mode (as schematically indicated in step S1b and S1c in FIG. 5). Thus, the terminal devices UEb and UEc are not involved in receiving user-plane data from the base station 404 on the primary or secondary component carriers associated with LAA operation. However, the terminal device UEa is assumed to be involved in ongoing communications with the base station and receiving data on the primary component carrier and the secondary component carrier in accordance with the principles of any known schemes for LAA operation (as schematically indicated step S2a in FIG. 5). This situation may be assumed to have arisen in accordance with conventional operating procedures within the wireless telecommunications system, for example having regard to whether or not the respective terminal devices have a need to communicate user-plane data at the corresponding time. Although in this particular scenario the first terminal device UEa is assumed to be involved in ongoing LAA communications and, as described herein, terminal devices in idle mode may be configured to provide measurement reporting to support the base station's LAA operation, the operating status of the first terminal device in this regard is not significant to the process of measurement reporting in accordance with the principles described herein. For example, even when the base station is not supporting LAA operations with the first terminal device UEa (or indeed with any other terminal devices), measurement reporting in accordance with the principles described herein may still be employed to allow the base station to determine an appropriate configuration for subsequent LAA operation. For example, a wireless telecommunications system may be configured to employ measurement reporting in respect of radio resources in an LAA band using idle mode terminal devices as described herein to determine whether or not LAA operations should be initiated, for example in response to an increase in traffic load, even when LAA operation is not currently configured for use.

As is well known, base stations in wireless telecommunications systems broadcast information that allows terminal devices to operate within the base station's cell. In an LTE-based wireless telecommunications system some of the fundamental information required for a terminal device to operate in a cell is transmitted on PBCH in the Master Information Block (MIB). Other information regarding the system configuration is divided among System Information Blocks (SIBs) referred to as SIB1, SIB2, SIB3, . . . etc. (there are 16 SIBs defined as of Release 11 LTE). The SIBs are transmitted in system information (SI) messages, which, apart from SIB1, may contain multiple SIBs. There may be one or several SI messages transmitted at different periodicities. Each SI message may convey multiple SIBs suitable for scheduling with the same periodicity. The timings for SIB1 transmissions are fixed on an 80 ms period and they occur in the fifth subframe of radio frames when System Frame Number (SFN) is a multiple of 8 (i.e. SFN mod 8=0). There are retransmissions of SIB1 provided in every other radio frame within the 80 ms period. The timings for other SIB transmissions are configured in SIB1. The transmission resource allocations for the SI messages on PDSCH within a subframe are provided to terminal devices using PDCCH allocation messages addressed to SI-RNTI (System Information Radio Network Temporary Identifier—currently 0xFFFF in LTE). At higher layers, SI is carried on the logical broadcast control channel (BCCH). Thus, system information signalling provides an established mechanism for allowing base stations to convey configuration information to terminal devices.

In accordance with embodiments of the disclosure, the base station 404 is adapted to transmit system information which includes measurement configuration information defining how terminal devices should monitor radio channel conditions for radio resources within the second frequency band, and this may be regardless of whether the terminal devices are operating in the connected mode or the idle mode. In one implementation, the measurement configuration conveyed by the information in system information may define one or more measurement objects which the base station would like the terminal devices to monitor and report on if a corresponding trigger condition is met.

Thus, as represented in step S3 in FIG. 5, the base station transmits system information which comprises a LAA measurement configuration, for example conveying information with regard to which radio resources should be monitored by the terminal devices in accordance with embodiments of the disclosure and characteristics relating to the criterion/criteria which, when met, give rise to a measurement report. For example, the measurement configuration may indicate the terminal devices should measure radio channel conditions on radio resources corresponding to a frequency channel which the base station is currently using for LAA operation in the second frequency band, for example to support communications with the first terminal device UEa as represented in step S2a of FIG. 5. The measurement configuration may further indicate the nature of the measures to be made, for example whether the measurement should comprise a measurement of a received power for reference signalling from the base station on the relevant radio resources, e.g. RSRP in an LTE context, and/or a measurement of a received quality for reference symbol signalling on the relevant radio resources, e.g. RSRQ in an LTE context, and/or a measurement of a received signal strength on the relevant radio resources, e.g. RSSI in an LTE context. In this regard, the measurements themselves may broadly correspond with conventional measurements made in wireless telecommunications systems. The measurement configuration may further provide an indication of when the measurement should be made, for example by defining a monitoring schedule for the measurements.

In steps S4a, S4b and S4c represented in FIG. 5 the respective terminal devices UEa, UEb, UEc begin monitoring for an event trigger condition in accordance with the measurement configuration received in step S3. A significant aspect of this is that the terminal devices UEb and UEc operating in the idle mode monitor for the event trigger condition in much the same way as the terminal device UEa operating in the connected mode. Apart from this, the step of monitoring for the event trigger condition may be based on generally established techniques of the kind performed by RRC connected terminal devices in wireless telecommunications systems. For example, the respective terminal devices may each be configured to measure a characteristic of radio channel conditions on the relevant radio resources within the second frequency band, for example in an LTE context this may be RSRP, RSRQ or RSSI, and determine whether or not their measurements indicate a predefined condition for triggering a measurement report is met. For example, the terminal devices may be configured to trigger a measurement report if RSRP or RSRQ measurements fall outside a range defined by a threshold value. More generally, the terminal devices may be configured to trigger a measurement report if they determine that a level of interference on the radio resources with which their current measurement configuration is associated is determined to exceed a predefined threshold (potentially also requiring this to occur for at least a certain amount of time—i.e. a "time-to-trigger"). In this regard, aspects of the trigger conditions (e.g. threshold value and/or time-to-trigger) may be selected in accordance with established techniques for setting measurement report trigger conditions in wireless telecommunications systems. Characteristics defining the trigger condition may be specified in an operating standard for the wireless telecommunications systems or may be selectable by the base station and conveyed to the terminal devices in prior signalling, for example in conjunction with the LAA measurement configuration of step S3. It is assumed here the respective terminal devices are configured to monitor for the event trigger condition by making a measurement of the relevant radio channel conditions and determining if the measurement meets the pre-defined trigger condition in a repeated manner in accordance with a monitoring schedule.

For example, the terminal devices may be configured to perform the measurements on a regular basis.

In step S5b represented in FIG. 5 it is assumed the second terminal device UEb determines that it has made a measurement of radio channel conditions that meets the condition for triggering a measurement report. This may be, for example, because the terminal device UEb is located relatively near to a WLAN access point that has begun operating on radio resources and so increases the interference measured by the terminal device UEb (in principle this increased interference could be associated with activation of a Wi-Fi module of the second terminal device itself). It is assumed here the first terminal device UEa involved in LAA communications with the base station 404 does not see any increase in interference because it is too far from the WLAN access point to receive it signalling. Accordingly, and as already discussed above, this can give rise to an issue with conventional measurement reporting approaches restricted to RRC connected terminal devices because the terminal device UEa that is operating on the LAA resources is not aware of the interference issue associated with the LAA operation. This means that in accordance with existing schemes the base station might simply continue making LAA transmissions that interfere with the WLAN access point. However, in accordance with embodiments of the disclosure, the second terminal device UEb which is currently in idle mode and not involved in any user-plane communications with the base station on the secondary component carrier, is nonetheless made aware of the interference issue and may report this to the base station.

Having determined that a measurement report should be communicated to the base station in Step S5b, the second terminal device UEb proceeds to establish an RRC connection with the base station (as indicated in FIG. 5 in step S6b) so that it becomes RRC connected (as indicated in step S7b). This process of switching from idle mode to connected mode may be performed in accordance with any conventional techniques.

Having transitioned to connected mode, and as indicated in step S8b in FIG. 5, the second terminal device UEb transmits a measurement report to the base station to indicate the relevant trigger criterion has been met. The transmission of the measurement report may be made in accordance with conventional measurement reporting techniques.

After transmitting the measurement report to the base station in step S8b terminal device UEb releases its RRC connection and returns to idle mode, as schematically represented in step S9b in FIG. 5. This process of RRC connection release and switching from connected mode to idle mode may be performed in accordance with conventional techniques. Having returned to RRC idle mode, and as represented in Step S10b, the second terminal device UEb continues to monitor for the event trigger condition. This may be performed in the same way as described above with reference to step S4b. In some example implementations the terminal device may be configured to delay transmitting any further measurement reports for a period of time after it has already done so. This may be to allow time for the base station to take action to seek to resolve the interference issue. In some cases the terminal device may remain in RRC connected mode for a period of time to allow it to more readily send further measurement reports in respect of further measurements of radio channel conditions so as to provide ongoing feedback to the base station as to whether the issue has been resolved without needing to repeatedly switch between RRC connected mode and RRC idle mode.

Having received the measurement report in step S8b, the base station 404 proceeds to determine whether it should modify any aspects of its LAA operation. For example, the base station may determine whether it should cease LAA operation on the relevant radio resources, for example by switching the secondary component carrier to other radio resources, or deactivating the secondary carrier for a period of time to allow the WLAN access point to access the radio resources without interference (or at least with reduced interference) from the base station transmissions. This decision-making may in general be performed in accordance with conventional measurement report based decision-making techniques, and in particular those proposed for use in LAA scenarios. That is to say, what is significant in accordance with certain embodiments of the disclosure is the manner in which terminal devices in idle mode may be configured to measure radio channel conditions on radio resources associated with LAA operation even though they are not involved in the LAA operation and not how the measurement reports are handled. Once the base station receives the measurement report it may be handled in a conventional manner with regard to the base station determining whether, and if so how, it should modify its LAA operation taking account of the measurement report. In the example represented in FIG. 5, it is assumed the base station 404 determines in step S9 that it should modify an operating characteristic of its LAA operation I view of the measurement report received from the second terminal device UEb. For example, the base station may determine that it should modify one or more characteristics of the secondary component carrier being used to support communications with the first terminal device UEa, such as the radio resources within the second frequency band used for the secondary component carrier, or a determination that the secondary component carrier should be deactivated, or a determination that downlink communications on the secondary carrier should not be scheduled for a period of time, e.g. as defined in accordance with established fairness/politeness protocols.

As schematically represented in FIG. 5 in step S5a, after determining that it should modify an operating characteristic of its LAA communications in step S9, the base station communicates the modified LAA configuration information to the first terminal device UEa and commences LAA operation in accordance with the modified LAA configuration (for example using different frequency resources within the second frequency band from those used for the LAA operation of step S2a). This aspect of the processing represented in FIG. 5 may be performed in accordance with previously proposed techniques for supporting changes in LAA operating characteristics in wireless telecommunications systems.

Thus, the processing described above with respect to the first and second terminal devices UEa, UEb show how a terminal device operating in an idle mode can be configured to provide measurement reports in respect radio resources supporting LAA operation for another terminal device operating in a connected mode. In effect, this means that terminal devices which are not involved in ongoing LAA operations can nonetheless provide the base station with information regarding how the LAA transmissions are interacting with transmissions for other wireless communications devices associated with a different wireless access technology (or a different telecommunications network operating according to the same wireless access technology) within the same radio environment.

Another aspect of operations in accordance with certain embodiments of the disclosure will now be described with reference to the processing steps associated with the first terminal device UEc represented in FIG. 5.

As already discussed above, in step S4c the terminal device UEc begins monitoring for the event trigger condition. It is assumed here the third terminal device UEc continues doing this without determining the trigger condition has occurred (e.g. because it is also too far from the WLAN access point interfering with the measurements made by the second terminal device as described above) until a point in time at which it wishes to establish RRC connection to the base station (as indicated in FIG. 5 in step S5c) so that it becomes RRC connected (as indicated in step S6c). This process of switching from idle mode to connected mode may be performed in accordance with conventional techniques and the reason why the switch is made is not significant here. For example, the switch to connected mode may be made because the terminal device UEc has data it needs to transmit to the base station or because the base station has paged the terminal device UEc.

After switching to RRC connected mode, the terminal device UEc continues to monitor for the event trigger condition in accordance with the LAA measurement configuration received in step S3 while in the connected mode. In this regard, a significant aspect of the processing represented in FIG. 5 is that a terminal device may continue monitoring for a trigger event in accordance with a LAA measurement configuration (e.g. defining one or more measurement objects) after switching from idle most to connected mode. That is to say, a significant aspect of certain embodiments of the disclosure is in maintaining a measurement configuration after a change in RRC state (i.e. from idle to connected or, as discussed further below, from connected to idle.)

When the base station modifies its LAA operation, it may be appropriate to reconfigure the measurements performed by terminal devices to suit the modified LAA configuration (e.g. because there has been a change in radio resources used to support the LAA carrier). Such a change may be conveyed by updating system information to reflect the new configuration in accordance with conventional techniques. In this regard, it will be appreciated that for changes of system information other than those related to EAB (Extended Access Barring), ETWS (Earthquake Tsunami Warning System) and CMAS (Commercial Mobile Alert System), there is a BCCH modification period defined (which may be referred to as a "SI modification period"). SI modification period boundaries are defined on radio frames for which SFN mod q=0, for a cell-specific value of q. When there is a change in system information, the new system information is transmitted from the start of a new SI modification period.

The general process for implementing a change in system information in an LTE-based network is described, for example, in ETSI TS 136 331 V 11.7.0 (2014-03)/3GPP TS 36.331 version 11.7.0 Release 11 [6]. In summary, a base station indicates a change of system information as follows.

1. When the network changes system information it notifies terminal devices about the change by transmitting a PDCCH resource allocation message addressed to the paging RNTI (P-RNTI). This directs the terminal devices to decode PDSCH resources containing a Paging message with a SystemInfoModification flag set to true. This may be done, for example, throughout one SI modification period. Both RRC_IDLE and RRC_CONNECTED terminal devices check for paging messages periodically. It may be noted that EAB alterations, ETWS and CMAS notifications may be separately modified with separate flags in a paging message (but can also be modified along with other SIBs).

2. In a following SI modification period, the network transmits the modified system information, and may increment a SystemInfoValueTag in SIB1. This value tag can indicate changes in any SIB, but it might not be used for EAB, ETWS, CMAS and some regularly changing SI parameters such as CDMA2000 system time. Terminal devices can use SystemInfoValueTag to verify if currently stored system information is still valid, for example on return from being out of coverage when the UE may have missed a system information change notification in paging.

The terminal devices may thus be advised of the need to acquire new system information reflecting a change in LAA configuration in signalling received from the base station. This may be performed in accordance with conventional techniques. For example in the same way as existing schemes associated with non-EAB, non-ETWS, and non-CMAS system information update approaches, or where a faster response is desired, using existing schemes based on EAB, ETWS, CMAS system information update approaches.

More details on system information and changes in system information in an LTE-based system can be found in ETSI TS 136 331 V 11.7.0 (2014-03)/3GPP TS 36.331 version 11.7.0 Release 11 [6].

As noted above, in some implementations, a base station may alternatively, or in addition, convey LAA measurement configuration information to individual terminal devices through dedicated signalling, and an example of this is schematically represented in step S8c which shows the base station conveying an updated LAA measurement configuration to the first terminal device (in practice it may be expected the base station will also convey the indication of the updated LAA measurement configuration to the other terminal devices, e.g. through updated system information or dedicated signalling corresponding to that represented step S8c, but this is not shown in FIG. 5 for simplicity).

As schematically represented in step S9c, the terminal device UEc receiving the updated LAA measurement configuration proceeds to monitor for the event trigger condition in accordance with the updated measurement configuration (as will other terminal devices receiving the updated measurement configuration, whether in idle mode or connected mode). Apart from the different measurement configuration (e.g. different radio resources and/or different trigger criterion) the terminal device UEc may monitor for the updated event trigger condition in the same manner as described above (albeit with the terminal device currently in RRC connected mode).

It is assumed here this third terminal device UEc continues doing this without determining the updated trigger condition has occurred until a point in time at which it releases its RRC connection and returns to RRC idle mode, as schematically indicated in FIG. 5 in step S10c. This process of switching from connected mode to idle mode may be performed in accordance with conventional techniques and the reason why the switch is made is not significant here. For example, the switch to idle mode may be made because the terminal device UEc.

After switching to RRC idle mode, the terminal device UEc continues to monitor for the event trigger condition in accordance with the updated LAA measurement configuration received in step S8c while in the idle mode, as schematically represented in step S11c. In this regard, and as already noted, a significant aspect of the processing represented in FIG. 5 is that a terminal device may continue monitoring for a trigger event in accordance with a current LAA measurement configuration after switching from connected mode to idle mode (i.e. an RRC state transition). In this regard a terminal device may thus perform measurements in accordance with a measurement configuration received by the terminal device when in a connected mode after it has switched to an idle mode. Conversely, a terminal device may perform measurements in accordance with a measurement configuration received by the terminal device when in an idle mode after it has switched to a connected mode.

Although not shown in FIG. 5, if a terminal device determines from a measurement of the relevant radio channel conditions that the criterion for triggering a measurement report is met when the terminal device happens to be operating in RRC connected mode, the terminal device may proceed to transmit a measurement report to the base station to indicate this has happened in accordance with conventional measurement reporting techniques.

It will be appreciated there are various aspects of the processing represented in FIG. 5 that may be different for other implementations of embodiments of the disclosure. For example, rather than have the measurement configuration information conveyed by the base station to the terminal devices in system information, other techniques may be adopted. For example, the LAA measurement configuration may be communicated to individual terminal devices through dedicated signalling.

Furthermore, whereas the description of the processing represented in FIG. 5 has primarily focused on a situation in which the trigger condition is associated with determining a level of interference measured in respect of the relevant radio resources exceeds a threshold amount, in another example the trigger condition may be associated with a terminal device determining that the secondary component carrier is configured for use on radio resources which are known by the terminal device to be in use by another radio access technology. This may be, for example, because the terminal device itself wishes to use the relevant radio resources for communicating in accordance with another radio access technology (e.g. Wi-Fi or Bluetooth), or because the terminal device recognises that another wireless communications device is already using those resources, for example from Wi-Fi channel configuration information being transmitted in association with the other wireless communications device. In this regard, determining whether the trigger criterion is met may comprise determining if the base station is transmitting on radio resources which overlap with radio resources being used by another wireless communications device operating within a coverage area of the base station. That is to say, in accordance with the terminology used herein the process of making a measurement of radio channel conditions in accordance with a measurement configuration should be interpreted broadly to include determining if a measurement configuration is associated with radio resources which are known to be in use by another radio access technology without necessarily requiring any actual physical channel measurements to be made. In this regard making a measurement of radio channel conditions in accordance with the principles described herein may also be referred to as assessing radio channel conditions.

In some implementations, there may be some aspects of measurement configuration which are automatically modified on transition between idle and connected mode. For example, in idle mode a terminal device may be configured to trigger measurement of supporting only if its own WLAN module starts a communication session on radio resources corresponding to the LAA channel configured for measurement, whereas in connected mode the terminal device may automatically become configured to trigger measurement reporting based upon detection of an interference level being above a threshold.

Thus the approaches described above with reference to FIG. 5 represent new ways of providing measurement reports in wireless telecommunications systems supporting LAA operation. These approaches show how any terminal device, even those not currently configured to use LAA, operating in a wireless telecommunications system can be utilized to perform radio channel measurements in real-time and to report if it is observing interference issues. This can help address the hidden node problem discussed above by in effect providing the base station with more measurements of radio channel conditions. Furthermore, these approaches can be adopted in some implementations without significant overhead signalling because only terminal devices which observe an interference issue may be configured to report corresponding measurements. Furthermore, in some implementations the measurement configuration may be communicated by broadcast signalling (i.e. signalling transmitted to a plurality of terminal device), thereby avoiding the need to individually configure terminal devices (although in some implementations this may be done).

Figure 6:
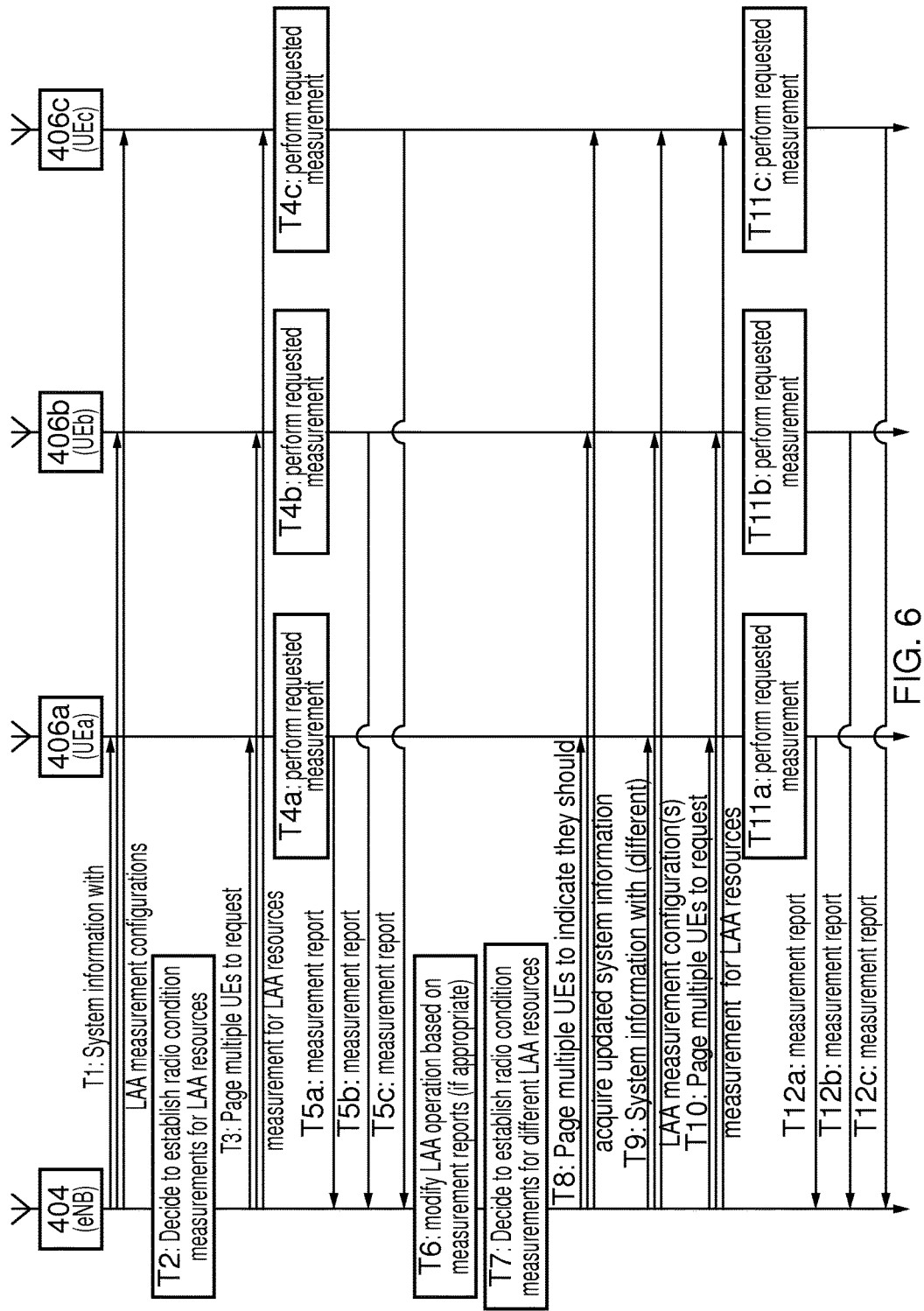
FIG. 6 is a signalling ladder diagram representing some operating aspects of a base station and a terminal device in accordance with some other embodiments of the disclosure.

FIG. 6 is a signalling ladder diagram schematically representing example modes of operation for the base station (eNB) 404 and the first terminal device 406a (UEa), second terminal device 406b (UEb) and third terminal device 406c (UEc) represented in FIG. 4 in accordance with certain embodiments of the present disclosure. As with FIG. 5, the general scenario represented in FIG. 6 is one in which the wireless telecommunications system 400 is configured to support LAA (LTE-U) operations based on previously proposed schemes with modifications to provide functionality in accordance with embodiments of the disclosure described herein. In particular, in accordance with certain implementations, terminal devices (whether in idle or connected mode) may be requested to perform measurements (and corresponding measurement reporting based on the measurements as appropriate) in respect of radio resources in the second frequency band which are being used (or may be used) for LAA operation. The base station may then take account of the measurement reporting obtained from terminal devices in accordance with the principles described herein when determining whether, and if so how, to operate one or more secondary carriers supporting communications with one or more terminal devices in the unlicensed band—i.e. the base station may take account of the measurement reports it receives to establish operating characteristics for communications on the secondary component carrier.

The measurements may be requested (triggered) by the base station transmitting a request message to a plurality of terminal devices to request that at least some of the plurality of terminal devices make measurements of radio channel conditions for radio resources within the second frequency band in accordance with a measurement configuration associated with the request message. The request message may, for example, comprise group paging addressed to (i.e. comprising an identifier associated with) a plurality of terminal devices.

The request message may comprise measurement configuration information for the measurement to be made. In some examples this may comprise an indication of specific measurement configuration parameters (for example in terms which radio resources to measure and/or when to measure and/or what radio channel condition to measure and/or a measurement report trigger condition). In other examples the measurement configuration information may comprise an indication of a previously established/semistatic measurement configuration to use, for example by reference to an identifier for one or more predefined potential measurement configurations. For this approach the predefined potential measurement configurations may, for example, be defined by system information signalling transmitted by the base station in advance of the request message, or may be defined in accordance with an operating specification for the wireless telecommunications system. In yet other examples the system may be associated with a single measurement configuration for the terminal devices to use when they receive a request to make measurements. In this case the request message may not comprise any express indication of the measurement configuration to use and the terminal devices may simply use whichever measurement configuration is currently defined, for example based on previously received measurement configuration information or measurement configuration information defined in accordance with an operating standard for the wireless telecommunications system. For the example implementation represented in FIG. 6, and as described further below, it is assumed a plurality of potential LAA measurement configurations are communicated to terminal devices in system information and a subsequent request message indicates which of these plurality of potential measurement configurations are to be used for the corresponding measurements.

On receiving a measurement report from one or more terminal devices in accordance with the principles described herein, the base station may take account of the measurement report(s) when determining whether, and if so how, to operate one or more secondary carriers supporting communications with one or more terminal devices in the unlicensed band—i.e. the base station may take account of the measurement reports it receives to establish operating characteristics for communications on the secondary component carrier. In this regard the base station may respond to the measurement reports in much the same way as described above for the processing represented in FIG. 5.

The processing schematically represented in FIG. 6 starts with the transmission of system information from the base station 404 which is received by the respective terminal devices 406a, 406b and 406c as schematically indicated in step T1. The system information may be received by the terminal devices in accordance with conventional techniques. However, the system information is modified to include information relating to a plurality of potential LAA measurement configurations. The different potential measurement configurations may, for example, correspond with different potential LAA channel configurations that may be supported by the base station. For example, there may be a number of potential LAA configurations that the base station may adopt, and with different LAA configurations may be associated with different radio resources within the second frequency band being used for the secondary component carrier. In this case there may be a corresponding number of potential measurement configurations established, with each potential measurement configuration providing a measurement in respect of the radio resources associated with a corresponding one of the potential LAA configurations. In some implementations, different measurement configurations may additionally or alternatively provide different threshold levels or criteria for triggering a measurement report, different valuation periods (times-to-trigger) or different reporting quantities/parameters (e.g. from among RSRP, RSRQ, RSSI). It will be appreciated there are other ways in which the base station may communicate the relevant LAA measurement configuration information to the terminal devices. For example, instead of, or in addition to, using system information the potential measurement configurations may be associated with respective measurement objects configured for the respective terminal devices through radio resource control signalling transmitted by the network infrastructure equipment to the respective terminal devices when in connected mode.

The measurement configuration(s) may broadly correspond with those discussed above. For example, the movement configuration(s) may comprise information with regard to which radio resources should be measured by the terminal devices and the nature of the measurements to be made (for example whether the measurement should comprise a measurement of a received power for reference signalling from the base station on the relevant radio resources and/or a measurement of a received power for reference symbol signalling on the relevant radio resources and/or a measurement of a received signal strength on the relevant radio resources (e.g. if there are no reference symbols being transmitted on the relevant radio resources, for example because the secondary component carrier is not currently activated on those resources)).

In step T2 the base station decides to establish radio channel condition measurements in accordance with one (or more) of the measurement configurations defined by the signalling of Step T1. The exact reason why the base station wishes to establish these measurements is not significant. For example, it may be that the base station is currently supporting a secondary component carrier on particular radio resources within the second frequency band, and wishes to obtain an overview of the radio channel conditions associated with the secondary carrier seen by various terminal devices operating in the wireless telecommunications network within the base station's coverage area. This may be because the base station is considering modifying its current LAA operation, for example in response to changing data traffic requirements, or simply because the base station is configured to request measurements on a regular basis as part of an ongoing monitoring process. In another example, the base station might not currently be operating a secondary component carrier on particular radio resources within the second frequency band, but may wish to determine if it is able to start operating a secondary carrier on these resources without unduly interfering with ongoing communications associated with other radio access technologies or another operator's wireless telecommunications network operating in the shared band in the radio environment of the base station.

Thus, in step T3 the base station transmits a request message to a plurality of terminal devices to request that the plurality of terminal devices make measurements of radio channel conditions for radio resources within the second frequency band in accordance with a measurement configuration associated with the request message and provide a corresponding measurement report to the base station. In this respect, one significant aspect of certain embodiments of the disclosure is that a base station may ask multiple terminal devices operating in the wireless telecommunications system for a measurement report. The request message may be transmitted in the form of a paging message addressed to those terminal devices which the base station would like to perform measurement reporting. In principle this could be every terminal device operating in the cell of the base station, or at least those having the capability of making measurements within the second frequency band, but in other cases the request message may be addressed only to a subset of the terminal devices. For example, the base station could address the paging message to a selected number of terminal devices which are explicitly identified in the paging message. Alternatively, a single group paging identity could be used which is associated with a plurality of terminal devices. Membership of the group could be established in prior signalling, for example terminal devices may be provided with an indication of one or more paging group identities with which they are associated during an earlier connection to the network. Membership of a paging group could also be established based on identifiers already associated with the terminal device, such as an IMSI or IMEI. For example, in order to request that 10% (statistically) of terminal devices react to a paging message, the paging message may indicate that any terminal devices associated with an IMSI/IMEI (or other identifier) ending in a specific single digit provided in the paging message should respond. Similar approaches can be used to request responses from different proportions of terminal devices. For example, if the base station would like one in eight terminal devices to respond, the paging message may indicate that any terminal devices having no remainder when dividing their identifier by eight should respond. Another approach to establishing which of the terminal devices should respond would be to provide an indication of the specific terminal devices (for example by reference to their IMSI/IMEI or other identifier) in system information broadcast by the base station. Terminal devices receiving the paging message may thus be configured to acquire this aspect of system information to see if they should react to the paging message. Yet another way to address a paging message to only a certain subset of terminal devices would be to send the paging message in only some paging occasions (paging occasions are a function of terminal device identity). In some situations the base station may be interested in responses from one or more specific terminal devices (for example because of an aspect of their previous measurement reporting or their location within the cell) and may target the paging request accordingly, whereas in other cases the subset of terminal devices may in effect be established randomly by the base station.

The request message further includes an indication of which of the plurality of potential LAA measurement configurations previously conveyed to the terminal devices in step T1 are to be used for the measurement in respect of which the request is made. For example, the request message may include a reference/index/identifier which indicates the relevant LAA measurement configuration which the base station would like the terminal devices to use. Accordingly, terminal devices receiving the request message are able to determine the nature of the measurement they are being requested to make (e.g. in terms of the radio resources in the second frequency band for which channel conditions are to be measured) from the request message.

In steps T4a, T4b and T4c represented in FIG. 6 the respective terminal devices UEa, UEb, UEc perform the requested measurement in accordance with the relevant measurement configuration. In this regard the measurements themselves may be based on generally established techniques for radio channel condition measurement and measurement reporting in wireless telecommunications systems. Thus, the respective terminal devices may each measure a characteristic of radio channel conditions on the relevant radio resources within the second frequency band, which may, for example in an LTE context, be RSRP, RSRQ or RSSI depending on the specific measurement configuration. This measurement may be performed by terminal devices regardless of whether or not they are in idle or connected mode when they receive the request message. A terminal device operating in idle mode when it receives the request message may transition to connected mode before making the measurement, or may make the measurement in idle mode, and then transition to the connected mode to make a measurement report (to the extent a measurement report is to be transmitted by that terminal device, for example having regard to whether its measurement meets a measurement report trigger condition). The measurements undertaken by the terminal devices may also be associated with a validity time. For example the terminal device may make measurements to monitor for the trigger condition, and determine if the trigger condition is not met within a specified period, it may cease making measurements.

In steps T5a, T5b and T5c represented in FIG. 6 the respective terminal devices UEa, UEb, UEc transmit measurement reports to the base station indicating the results of their respective measurements of radio channel conditions in accordance with the measurement request received in step T3. Any terminal devices making their measurement in idle mode may transition to RRC connected mode before doing this, for example in the manner described above with reference to the measurement reporting approach represented in FIG. 5. The transmission of the measurement reports from the respective terminal devices to the base station may be made in accordance with conventional measurement reporting techniques.

As schematically indicated in step T6, and having received the measurement reports in steps T5a, T5b and T5c, the base station 404 proceeds to determine whether it should modify any aspects of its LAA operation, i.e. modify any operating characteristic(s) for the secondary component carrier based on the measurement reports. For example, if the measurement reports indicate an undesirable degree of radio interference is observed by one or more terminal devices on the measured radio resources in the second frequency band, the base station may determine it should cease LAA operation on the relevant radio resources, for example by switching the secondary component carrier to other radio resources, or deactivating the secondary carrier for a period of time. As with the processing represented in FIG. 5, this decision-making may in general be performed in accordance with conventional measurement report based decision-making techniques, and in particular those that have been proposed for LAA scenarios. That is to say, what is significant in accordance with certain embodiments of the disclosure is the manner in which a plurality of terminal devices may be requested to make measurements of radio channel conditions for radio resources within the second frequency band in accordance with a measurement configuration associated with a request message rather than how the measurement reports are handled. Accordingly, once the base station receives the measurement reports they may be handled in a conventional manner with regard to the base station determining whether, and if so how, it should modify its LAA operation taking account of the measurement reports. If based on the measurement reports the base station determines that it should modify an aspect of its LAA operations, it may proceed to do so accordingly. This aspect of the processing may be performed in any conventional manner and is not represented in FIG. 6.

Thus, the processing represented in FIG. 6 in steps T1 to T6 provides a mechanism for a base station to readily ask a plurality of terminal devices for measurement reports in respect of radio channel conditions for radio resources within the second frequency band based on a measurement configuration associated with the request message. This can allow the base station to obtain information regarding radio channel conditions within its coverage area when determining an operating characteristic of its LAA operation. For example, the measurement reports may be used when determining one or more operating characteristics such as a selection of radio resources within the second frequency band to be used for the secondary component carrier, a determination as to whether or not the secondary component carrier should be activated for use, and a determination as to whether or not the secondary component carrier should be deactivated.

If the base station wishes to establish radio resource measurements for different LAA resources corresponding to another of the predefined potential measurement configurations established in the signalling of step T1, the base station may simply send a request message similar to that described above in association with step T3, but indicating the different measurement configuration to be used.

However, there may be some situations where the base station determines that it wishes is to establish radio channel conditions for LAA resources which do not correspond with one of the currently-defined potential measurement configurations. In this context, another aspect of operations in accordance with certain embodiments of the disclosure will now be described with reference to the processing steps T7 to T12 represented in FIG. 6.

Thus in step T7 the base station determines that it should establish radio channel condition measurements in respect of radio resources which do not correspond with one of the potential measurement configurations established in association with step T1. As discussed above in relation to step T2, the exact reason why the base station wishes to establish these measurements is not significant.

In order to convey the new LAA measurement configuration information to the terminal devices the base station may update the system information being transmitted in the cell to reflect the new LAA measurement configuration. Accordingly, in step T8 the base station pages the terminal devices to indicate they should acquire updated system information. In this regard, the process of indicating the terminal devices should acquire updated system information may be performed in accordance with conventional techniques, such as discussed above, for example using the existing schemes associated with non-EAB, non-ETWS, and non-CMAS system information update approaches, or where a faster response is desired, using existing schemes based on EAB, ETWS, CMAS system information update approaches.

Having indicated to the terminal devices that they should acquire the updated system information, the base station transmits the updated system information, as schematically indicated in step T9. Step T9 may be performed in the same way as step T1 discussed above, except the information content of the system information signalling will reflect the different measurement configuration information (e.g. specifying a new potential LAA measurement configuration associated with a new set of radio resources to measure).

As schematically indicated in step T10, and after having provided the terminal devices with the updated measurement configuration information in step T9, the base station transmits a request message to the plurality of terminal devices to request they make measurements of radio channel conditions for radio resources within the second frequency band in accordance with the newly established measurement configuration. Step T10 may be performed in the same manner as step T3 described above with the request message (paging message) comprising an indication of the relevant one of the potential measurement configurations defined in the system information of step T9.

In a variation of the approach represented in FIG. 6, terminal devices may be configured to assume that whenever they acquire updated system information with different LAA measurement configuration information (such as in step T9 presented in FIG. 6) they should also interpret this as a request message to undertake a measure reporting process in accordance with the principles described herein. That is to say, in some implementations the signalling of step T10 may in effect be implicit signalling and not comprise any explicit transmissions from the base station.

In steps T11a, T11b and T11c represented in FIG. 6 the respective terminal devices UEa, UEb, UEc perform the requested measurement in accordance with the relevant measurement configuration. These steps may be performed in the same manner as steps T4a, T4b and T4c discussed above.

In steps T12a, T12b and T12c represented in FIG. 6 the respective terminal devices UEa, UEb, UEc transmit measurement reports to the base station indicating the results of their respective measurements of radio channel conditions in accordance with the measurement request received in step T10. These steps may be performed in the same manner as steps T5a, T5b and T5c discussed above.

Having received the measurement reports in steps T12a, T12b and T12c, the base station 404 may proceed to determine whether it should modify any aspects of its LAA operation in the same manner as discussed above with reference to step T6.

Accordingly, the processing of FIG. 6 demonstrates how a plurality of terminal devices can be paged to provide measurement reports in respect of selected ones of different potential measurement configurations, and how the potential measurement configurations may be changed.

It will be appreciated the processing represented in FIG. 6 may be modified in accordance with other example implementations. For example, in the processing of FIG. 6 it is assumed that all terminal devices which receive a request to make measurements send a measurement report to the base station in respect of their measurements. However, in other implementation only a subset of the terminal devices receiving the measurement request may send a report.

For example, in some implementations the respective terminal devices may only send a measurement report if their respective measurements meet a trigger condition, for example of the type discussed above with regards to the approach of FIG. 5. For example, the terminal devices may be configured to only trigger a measurement report if they determine that a level of interference on the radio resources they are requested to measure is determined to exceed a predefined threshold (potentially also requiring this to occur for at least a certain amount of time—i.e. a "time-to-trigger"). In this regard, and as already mentioned above in relation to the FIG. 5 approach, aspects of the trigger conditions (e.g. threshold value and/or time-to-trigger) may be selected in accordance with established techniques for setting measurement report trigger conditions in wireless telecommunications systems. Characteristics defining the trigger condition may be specified in an operating standard for the wireless telecommunications systems or may be selectable by the base station and conveyed to the terminal devices, for example in association with the request message. In cases where the terminal devices may be configured to selectively respond to the request for measurement based on the results of the measurement, this may always be the case, or the request message may provide an indication that this approach is to be adopted in respect of a specific request.

Furthermore in some implementations only a subset of terminal devices to which the request message is addressed may be expected to respond by making measurements. This is to help reduce the risk of large numbers of measurement reports being transmitted at around the same time from impacting the performance of the wireless telecommunications system.

In cases where only a subset of the terminal devices to which the request message is addressed are requested to undertake measurement reporting in accordance with the principles described herein, the request message may comprise information indicating this is the case. For example, the request message may comprise an indication that a given percentage of terminal devices are requested to undertake measurement reporting. The terminal devices may then individually decide whether or not to undertake measurement reporting on a statistical basis in accordance with the desired percentage of respondents. For example, the request message might indicate the base station would like only 10% of terminal devices receiving the message to respond by undertaking measurements/measurement reporting. The terminal devices receiving the request message may thus generate a random number between 0 and 1, and determine that they should proceed with measurement reporting only if their random number is between 0 and 0.1. Of course it will be appreciated there are many other ways in which the number of responses can be restricted in this sort of way. For example, each terminal device operating in a wireless telecommunications system will typically be associated with some form of identifier, such as an IMSI, and the request message may indicate a two-digit number, or multiple two-digit numbers such as a range of numbers, whereby only terminal devices whose identifier comprises two digits at the end that match the number(s) identified in the request message will response to the request.

In some cases the subset of terminal devices which respond to the request message may be based on their locations. For example, it is commonplace for terminal devices to have an understanding of their current geographic location, e.g. using GPS receiver technology. Accordingly, the base station may transmit a request message that indicates only terminal devices within a certain region are requested to respond. This can help the base station understand the geographic location of areas of interference within its coverage area, for example to help identify the location of a "hidden node". In another example, the base station itself may have knowledge of the locations of terminal devices and may address the request message only to those in a desired geographic location. In another approach, the terminal device reports may themselves contain location information for the reporting terminal device to again help the base station map where interference is occurring within its coverage area.

It will be appreciated there are various modifications of the processing represented in FIG. 6 that may be adopted in accordance with other example implementations. For example, rather than establish a plurality of potential measurement configurations with the request message indicating which measurement configuration is to be used, the request message may itself comprise the information defining the measurement configuration to be used. This provides the base station with a higher degree of flexibility in which measurements can be configured but increases the amount of signalling required for the request message.

It will be appreciated that while the above-described embodiments are focused on a single base station supporting both the primary component carrier the secondary component carrier, more generally these could be transmitted from separate base stations. In this regard, the network-side processing in accordance with embodiments of the present disclosure may be performed by network infrastructure equipment which comprises, for example, one base station or more than one base station, and potentially other network infrastructure equipment elements according to the operating principles of the wireless telecommunications network in which the approach is implemented.

It will be appreciated the principles described above may be applied in respect of a wireless telecommunications system supporting carrier aggregation with secondary component carriers operating in a frequency band over which the wireless telecommunications system does not have exclusive control irrespective of whether or not the wireless telecommunications system requires an administrative license to operate in the secondary frequency band. That is to say, it will be appreciated the terminology "unlicensed" is used herein for convenience to refer to operation in a band over which the wireless telecommunications system does not have exclusive access. In many implementations this will correspond with a licence exempt frequency band. However, in other implementations the operation may be applied in a frequency band which is not unlicensed in the strict administrative sense, but which is nonetheless available for shared/opportunistic use by devices operating according to different wireless access technologies (e.g. LTE-based, Wi-Fi-based and/or Bluetooth-based technologies) and/or multiple networks operating according to the same technology (e.g. LTE-based wireless communication systems provided by different network operators). In this regard the terminology such as "unlicensed frequency band" may be considered to refer generally to a frequency band in which resources are shared by different wireless communications systems. Accordingly, while the term "unlicensed" is commonly used to refer to these types of frequency bands, in some deployment scenarios an operator of a wireless telecommunications system may nonetheless be required to hold an administrative license to operate in these frequency bands. Operation of the kind described herein is sometimes referred to as being Licence Assisted Access (LAA) as opposed to being unlicensed. For example, the term LTE-LAA may be used in place of LTE-U, and so on. This terminology reflects the nature of the operation in using communications on frequencies which are licensed for use by an operator to assist access on other frequencies which are not exclusively licensed for use by the operator.

Thus there has been described a method of operating a terminal device in a wireless telecommunications system. The system is configured to support communications between network infrastructure equipment and terminal devices using a primary component carrier operating on radio resources within a first frequency band and a secondary component carrier operating on radio resources within a second frequency band. The system supports a connected mode of operation in which terminal devices receive a type user-plane data from the network infrastructure equipment using the primary and/or secondary component carrier and an idle mode of operation in which terminal devices do not receive that type of user-plane data from the network infrastructure equipment. The method comprises: establishing a measurement configuration for making measurements of radio channel conditions for radio resources within the second frequency band; making a measurement of radio channel conditions for radio resources within the second frequency band in accordance with the measurement configuration while the terminal device is operating in the idle mode; determining if the measurement of radio channel conditions meets a trigger criterion, and if so, transmitting a measurement report to the network infrastructure equipment to indicate the trigger criterion has been met.

There has also been described a method of operating network infrastructure equipment in a wireless telecommunications system. the system is configured to support communications between the network infrastructure equipment and terminal devices using a primary component carrier operating on radio resources within a first frequency band and a secondary component carrier operating on radio resources within a second frequency band. The method comprises: transmitting a request message to a plurality of terminal devices to request that at least some of the plurality of terminal devices make measurements of radio channel conditions for radio resources within the second frequency band in accordance with a measurement configuration associated with the request message; receiving measurement reports from at least some of the plurality of terminal devices indicating their respective measurements of radio channel conditions; and establishing an operating characteristic for the secondary component carrier based on the measurement reports.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a terminal device in a wireless telecommunications system configured to support communications between network infrastructure equipment and terminal devices using a primary component carrier operating on radio resources within a first frequency band and a secondary component carrier operating on radio resources within a second frequency band, wherein the wireless telecommunications system supports a connected mode of operation in which terminal devices receive user-plane data from the network infrastructure equipment using the primary and/or secondary component carrier and an idle mode of operation in which terminal devices do not receive user-plane data from the network infrastructure equipment, wherein the method comprises: establishing a measurement configuration for making measurements of radio channel conditions for radio resources within the second frequency band; making a measurement of radio channel conditions for radio resources within the second frequency band in accordance with the measurement configuration while the terminal device is operating in the idle mode; determining if the measurement of radio channel conditions meets a trigger criterion, and if so, transmitting a measurement report to the network infrastructure equipment to indicate the trigger criterion has been met.

Paragraph 2. The method of paragraph 1, wherein the measurement configuration is established from signalling received from the network infrastructure equipment.

Paragraph 3. The method of paragraph 2, wherein the measurement configuration is established from system information signalling broadcast by the network infrastructure equipment to a plurality of terminal devices.

Paragraph 4. The method of paragraph 2, wherein the measurement configuration is established from dedicated signalling transmitted from the network infrastructure equipment to the terminal device.

Paragraph 5. The method of any one of paragraphs 1 to 4, further comprising the terminal device switching from the idle mode of operation to the connected mode of operation to transmit the measurement report to the network infrastructure equipment.

Paragraph 6. The method of any one of paragraphs 1 to 5, wherein the measurement configuration is associated with one or more measurement objects specifying the radio resources within the second frequency band in respect of which the measurement of radio channel conditions is to be made.

Paragraph 7. The method of any one of paragraphs 1 to 6, wherein the radio resources in respect of which the measurement of radio channel conditions is made are associated with one or more frequency channels on which the secondary component carrier may operate in the second frequency band.

Paragraph 8. The method of any one of paragraphs 1 to 7, wherein the measurement of radio channel conditions comprises one or more measurements selected from the group comprising: (i) a measurement of a received power for reference signals transmitted by the network infrastructure equipment on the secondary component carrier; (ii) a measurement of a received quality for reference signals transmitted by the network infrastructure equipment on the secondary component carrier; and (iii) a measurement of a signal strength received by the respective terminal devices on the radio resources.

Paragraph 9. The method of any one of paragraphs 1 to 8, wherein determining if the measurement of radio channel conditions meets the trigger criterion comprises determining if a level of radio interference determined from the measurement of radio channel conditions exceeds a predefined threshold value.

Paragraph 10. The method of any one of paragraphs 1 to 9, wherein determining if the measurement of radio channel conditions meets the trigger criterion comprises determining if the network infrastructure equipment is transmitting on radio resources which overlap with radio resources being used by a wireless communications device operating within a coverage area of radio transmissions from the network infrastructure equipment.

Paragraph 11. The method of paragraph 10, wherein the wireless communications device is the terminal device itself.

Paragraph 12. The method of any one of paragraphs 1 to 11, wherein the measurement configuration comprises one or more indications selected from the group comprising: (i) an indication of the radio resources in respect of which the measurement of radio channel conditions is to be made; (ii) an indication of when the measurement of radio channel conditions is to be made; (iii) an indication of how the measurement of radio channel conditions is to be made; and (iv) an indication of the trigger criterion.

Paragraph 13. The method of any one of paragraphs 1 to 12, further comprising the terminal device switching from the connected mode of operation to the idle mode of operation after establishing the measurement configuration for making measurements of radio channel conditions and before making the measurement of radio channel conditions while the terminal device is operating in the idle mode.

Paragraph 14. The method of any one of paragraphs 1 to 13, further comprising the terminal device switching from the idle mode of operation to the connected mode of operation after making the measurement of radio channel conditions while the terminal device is operating in the idle mode and making one or more measurements of radio channel conditions for radio resources within the second frequency band in accordance with the measurement configuration while the terminal device is operating in the connected mode.

Paragraph 15. The method of any one of paragraphs 1 to 14, further comprising the terminal device establishing an updated measurement configuration for making measurements of radio channel conditions for radio resources within the second frequency band; making a further measurement of radio channel conditions for radio resources within the second frequency band in accordance with the updated measurement configuration; determining if the further measurement of radio channel conditions meets a trigger criterion associated with the updated measurement configuration, and if so, transmitting a measurement report to the network infrastructure equipment to indicate this.

Paragraph 16. The method of paragraph 15, wherein the updated measurement configuration is established in response to the terminal device switching between the idle mode of operation and the connected mode of operation.

Paragraph 17. The method of any one of paragraphs 1 to 16, further comprising repeatedly performing the steps of making a measurement of radio channel conditions for radio resources within the second frequency band in accordance with the measurement configuration and determining if the measurement meets a trigger criterion, and if so, transmitting a measurement report to the network infrastructure equipment in accordance with a monitoring schedule.

Paragraph 18. The method of any one of paragraphs 1 to 17, wherein the second frequency band comprises radio resources which are shared with wireless communication devices that are not part of the wireless telecommunications system.

Paragraph 19. The method of paragraph 18, wherein the wireless telecommunications system is configured to operate in accordance with a first wireless communications operating standard and the wireless communication devices that are not part of the wireless telecommunications system are configured to operate in accordance with a second wireless communications operating standard that is different from the first wireless communications operating standard.

Paragraph 20. The method of paragraph 19, wherein the first wireless communications operating standard is a cellular telecommunications operating standard and the second wireless communications operating standard is a non-cellular telecommunications operating standard.

Paragraph 21. A terminal device for use in a wireless telecommunications system configured to support communications between network infrastructure equipment and terminal devices using a primary component carrier operating on radio resources within a first frequency band and a secondary component carrier operating on radio resources within a second frequency band, wherein the wireless telecommunications system supports a connected mode of operation in which terminal devices receive user-plane data from the network infrastructure equipment using the primary and/or secondary component carrier and an idle mode of operation in which terminal devices do not receive user-plane data from the network infrastructure equipment, wherein the terminal device comprises a controller unit and a transceiver unit configured to operate together to: establish a measurement configuration for making measurements of radio channel conditions for radio resources within the second frequency band; make a measurement of radio channel conditions for radio resources within the second frequency band in accordance with the measurement configuration while the terminal device is operating in the idle mode; determine if the measurement of radio channel conditions meets a trigger criterion, and if so, transmit a measurement report to the network infrastructure equipment to indicate the trigger criterion has been met.

Paragraph 22. Circuitry for a terminal device for use in a wireless telecommunications system configured to support communications between network infrastructure equipment and terminal devices using a primary component carrier operating on radio resources within a first frequency band and a secondary component carrier operating on radio resources within a second frequency band, wherein the wireless telecommunications system supports a connected mode of operation in which terminal devices receive user-plane data from the network infrastructure equipment using the primary and/or secondary component carrier and an idle mode of operation in which terminal devices do not receive user-plane data from the network infrastructure equipment, wherein the circuitry comprises a controller element and a transceiver element configured to operate together to: establish a measurement configuration for making measurements of radio channel conditions for radio resources within the second frequency band; make a measurement of radio channel conditions for radio resources within the second frequency band in accordance with the measurement configuration while the terminal device is operating in the idle mode; determine if the measurement of radio channel conditions meets a trigger criterion, and if so, transmit a measurement report to the network infrastructure equipment to indicate the trigger criterion has been met.

Paragraph 23. A method of operating network infrastructure equipment in a wireless telecommunications system configured to support communications between the network infrastructure equipment and terminal devices using a primary component carrier operating on radio resources within a first frequency band and a secondary component carrier operating on radio resources within a second frequency band, wherein the wireless telecommunications system supports a connected mode of operation in which terminal devices receive user-plane data from the network infrastructure equipment using the primary and/or secondary component carrier and an idle mode of operation in which terminal devices do not receive user-plane data from the network infrastructure equipment, wherein the method comprises: communicating user plane-data with a first terminal device operating in the connected mode using the primary and/or secondary component carrier; configuring a second terminal device to make a measurement of radio channel conditions for radio resources within the second frequency band while the second terminal device is operating in the idle mode and to determine if the measurement of radio channel conditions meets a trigger criterion, and if so, transmit a measurement report to the network infrastructure equipment to indicate the trigger criterion has been met; receiving a measurement report from the second terminal device indicating the second terminal device has determined the measurement of radio channel conditions met the trigger criterion; and modifying the communication of user-plane data with the first terminal device using the primary and/or secondary component carrier in response thereto.

Paragraph 24. Network infrastructure equipment for use in a wireless telecommunications system configured to support communications between the network infrastructure equipment and terminal devices using a primary component carrier operating on radio resources within a first frequency band and a secondary component carrier operating on radio resources within a second frequency band, wherein the wireless telecommunications system supports a connected mode of operation in which terminal devices receive user-plane data from the network infrastructure equipment using the primary and/or secondary component carrier and an idle mode of operation in which terminal devices do not receive user-plane data from the network infrastructure equipment; wherein the network infrastructure equipment comprises a controller unit and a transceiver unit configured to operate together to: communicate user plane-data with a first terminal device operating in the connected mode using the primary and/or secondary component carrier; configure a second terminal device to make a measurement of radio channel conditions for radio resources within the second frequency band while the second terminal device is operating in the idle mode and to determine if the measurement of radio channel conditions meets a trigger criterion, and if so, transmit a measurement report to the network infrastructure equipment to indicate the trigger criterion has been met; receive a measurement report from the second terminal device indicating the second terminal device has determined the measurement of radio channel conditions met the trigger criterion; and modify the communication of user-plane data with the first terminal device using the primary and/or secondary component carrier in response thereto.

Paragraph 25. Circuitry for a network infrastructure equipment for use in a wireless telecommunications system configured to support communications between the network infrastructure equipment and terminal devices using a primary component carrier operating on radio resources within a first frequency band and a secondary component carrier operating on radio resources within a second frequency band, wherein the wireless telecommunications system supports a connected mode of operation in which terminal devices receive user-plane data from the network infrastructure equipment using the primary and/or secondary component carrier and an idle mode of operation in which terminal devices do not receive user-plane data from the network infrastructure equipment; wherein the circuitry comprises a controller element and a transceiver element configured to operate together to: communicate user plane-data with a first terminal device operating in the connected mode using the primary and/or secondary component carrier; configure a second terminal device to make a measurement of radio channel conditions for radio resources within the second frequency band while the second terminal device is operating in the idle mode and to determine if the measurement of radio channel conditions meets a trigger criterion, and if so, transmit a measurement report to the network infrastructure equipment to indicate the trigger criterion has been met; receive a measurement report from the second terminal device indicating the second terminal device has determined the measurement of radio channel conditions met the trigger criterion; and modify the communication of user-plane data with the first terminal device using the primary and/or secondary component carrier in response thereto.

REFERENCES

[1] Holma H. and Toskala A, "LTE for UMTS OFDMA and SC-FDMA based radio access", John Wiley and Sons, 2009
[2] ETSI TS 136 211 V 11.5.0 (2014-01)/3GPP TS 36.211 version 11.5.0 Release 11
[3] ETSI TS 136 212 V 11.4.0 (2014-01)/3GPP TS 36.212 version 11.4.0 Release 11
[4] ETSI TS 136 213 V 11.6.0 (2014-03)/3GPP TS 36.213 version 11.6.0 Release 11
[5] ETSI TS 136 321 V 11.5.0 (2014-03)/3GPP TS 36.321 version 11.5.0 Release 11
[6] ETSI TS 136 331 V 11.7.0 (2014-03)/3GPP TS 36.331 version 11.7.0 Release 11

What is claimed is:

1. A terminal device configured to operate in a wireless network configured to support communications with terminal devices using a primary component carrier operating on radio resources within a first frequency band and a secondary component carrier operating on radio resources within a second frequency band, wherein the wireless network supports a connected mode of operation in which terminal devices receive user-plane data from the wireless network using the primary and/or secondary component carrier and an idle mode of operation in which terminal devices do not receive user-plane data from the wireless network, the terminal device comprising:
   circuitry configured to
      receive first Radio Resource Control (RRC) signaling transmitted from the wireless network to the terminal device over the radio resources within the first frequency band, the first RRC signaling indicating a measurement configuration for making measurements of radio channel conditions for radio resources within the second frequency band, wherein the first frequency band is a licensed frequency band in the wireless network and the second frequency band is an unlicensed frequency band in the wireless network;
      identify the measurement configuration for making the measurements of radio channel conditions for radio resources within the second frequency band based on the first RRC signaling received from the wireless network, wherein the measurement configuration relates to at least measuring a signal strength received by the terminal device on the radio resources within the second frequency band;
      measure radio channel conditions for radio resources within the second frequency band in accordance with the measurement configuration;
      determine if the measurement of the signal strength comprising measurement of radio channel conditions meets a trigger criterion, and each time the trigger criterion is met, transmitting a measurement report to the network infrastructure equipment indicating that the trigger criterion has been met.

2. The terminal device of claim 1, wherein the circuitry is configured to control the terminal device to switch from the idle mode of operation to the connected mode of operation to transmit the measurement report to the network infrastructure equipment.

3. The terminal device of claim 1, wherein the measurement configuration is associated with one or more measurement objects specifying the radio resources within the second frequency band in respect of which the measurement of radio channel conditions is to be made.

4. The terminal device of claim 1, wherein the radio resources in respect of which the measurement of radio channel conditions is made are associated with one or more frequency channels on which the secondary component carrier may operate in the second frequency band.

5. The terminal device of claim 1, wherein determining if the measurement of radio channel conditions meets the trigger criterion comprises determining if a level of the measured signal strength exceeds a predefined threshold value.

6. The terminal device of claim 1, wherein the measurement configuration comprises one or more indications selected from the group comprising:
   (i) an indication of the radio resources in respect of which the measurement of radio channel conditions is to be made;
   (ii) an indication of when the measurement of radio channel conditions is to be made;
   (iii) an indication of how the measurement of radio channel conditions is to be made; and
   (iv) an indication of the trigger criterion.

7. The terminal device of claim 1, wherein the circuitry is configured to control the terminal device to switch from the connected mode of operation to the idle mode of operation after establishing the measurement configuration and before making the measurement of radio channel conditions while the terminal device is operating in the idle mode.

8. The terminal device of claim 1, wherein the circuitry is configured to control the terminal device to switch from the idle mode of operation to the connected mode of operation after making the measurement of radio channel conditions while the terminal device is operating in the idle mode and make one or more measurements of radio channel conditions for radio resources within the second frequency band in accordance with the measurement configuration while the terminal device is operating in the connected mode.

9. The terminal device of claim 1, wherein the circuitry is configured to:
   establish an updated measurement configuration for making measurements of radio channel conditions for radio resources within the second frequency band;
   make a further measurement of radio channel conditions for radio resources within the second frequency band in accordance with the updated measurement configuration; and
   determine if the further measurement of radio channel conditions meets a trigger criterion associated with the updated measurement configuration, and if so, transmitting a measurement report to the wireless network.

10. The terminal device of claim 9, wherein the updated measurement configuration is established in response to the terminal device switching between the idle mode of operation and the connected mode of operation.

11. The terminal device of claim 1, wherein the circuitry is configured to
   repeatedly perform the steps of measuring radio channel conditions for radio resources within the second frequency band in accordance with the measurement configuration; and
   determine if the measurement meets a trigger criterion, and if so, transmitting a measurement report to the network infrastructure equipment in accordance with a monitoring schedule.

12. The terminal device of claim 1, wherein the second frequency band comprises radio resources which are shared with wireless communication devices that are not part of the wireless network.

13. The terminal device of claim 12, wherein the wireless network is configured to operate in accordance with a first wireless communications operating standard and the wireless communication devices that are not part of the wireless network are configured to operate in accordance with a second wireless communications operating standard that is different from the first wireless communications operating standard.

14. The terminal device of claim 13, wherein the first wireless communications operating standard is a cellular telecommunications operating standard and the second wireless communications operating standard is a non-cellular telecommunications operating standard.

15. A method of operating a terminal device for use in a wireless network configured to support communications with terminal devices using a primary component carrier operating on radio resources within a first frequency band and a secondary component carrier operating on radio resources within a second frequency band, wherein the wireless network supports a connected mode of operation in which terminal devices receive user-plane data from the network infrastructure equipment using the primary and/or secondary component carrier and an idle mode of operation in which terminal devices do not receive user-plane data from the wireless network, the method comprising:
   receiving first Radio Resource Control (RRC) signaling transmitted from the wireless network to the terminal device over the radio resources within the first frequency band, the first RRC signaling indicating a measurement configuration for making first measurements of radio channel conditions for radio resources within the second frequency band, wherein the first frequency band is a licensed frequency band in the wireless network and the second frequency band is an unlicensed frequency band in the wireless network;
   identifying the measurement configuration for making the measurements of radio channel conditions for radio resources within the second frequency band based on the first RRC signaling received from the wireless network, wherein the measurement configuration relates to at least measuring a signal strength received by the terminal device on the radio resources within the second frequency band;
   measuring radio channel conditions for radio resources within the second frequency band in accordance with the measurement configuration;
   determining if the measurement of the signal strength comprising measurement of radio channel conditions meets a trigger criterion, and each time the trigger criterion is met, transmitting a measurement report to the network infrastructure equipment indicating that the trigger criterion has been met.

16. Circuitry for a terminal device for use in a wireless network configured to support communications with terminal devices using a primary component carrier operating on radio resources within a first frequency band and a secondary component carrier operating on radio resources within a second frequency band, wherein the wireless network supports a connected mode of operation in which terminal devices receive user-plane data from the wireless network using the primary and/or secondary component carrier and an idle mode of operation in which terminal devices do not receive user-plane data from the wireless network, the circuitry configured to:
   receive first Radio Resource Control (RRC) signaling transmitted from the wireless network to the terminal device over the radio resources within the first frequency band, the first RRC signaling indicating a measurement configuration for making measurements of radio channel conditions for radio resources within the second frequency band, wherein the first frequency band is a licensed frequency band in the wireless network and the second frequency band is an unlicensed frequency band in the wireless network;

identify the measurement configuration for making the measurements of radio channel conditions for radio resources within the second frequency band based on the first RRC signaling received from the wireless network, wherein the measurement configuration relates to at least measuring a signal strength received by the terminal device on the radio resources within the second frequency band;

measure radio channel conditions for radio resources within the second frequency band in accordance with the measurement configuration;

determine if the measurement of the signal strength comprising measurement of radio channel conditions meets a trigger criterion, and each time the trigger criterion is met, transmitting a measurement report to the network infrastructure equipment indicating that the trigger criterion has been met.

* * * * *